United States Patent [19]

Saito et al.

[11] 4,429,076

[45] Jan. 31, 1984

[54] THERMOPLASTIC POLYMER COMPOSITION

[75] Inventors: Akira Saito, Fujisawa; Akio Yamori, Kawasaki; Hideo Morita, Yokohama, all of Japan

[73] Assignee: Asahi Kasei Kogyo Kabushiki Kaisha, Osaka, Japan

[21] Appl. No.: 157,167

[22] Filed: Jun. 6, 1980

[30] Foreign Application Priority Data

| Jun. 13, 1979 | [JP] | Japan | 54-73492 |
| Feb. 16, 1980 | [JP] | Japan | 55-17210 |
| Feb. 16, 1980 | [JP] | Japan | 55-17212 |
| Feb. 16, 1980 | [JP] | Japan | 55-17213 |
| Feb. 16, 1980 | [JP] | Japan | 55-17214 |
| Feb. 16, 1980 | [JP] | Japan | 55-17215 |
| Feb. 22, 1980 | [JP] | Japan | 55-20568 |
| Feb. 22, 1980 | [JP] | Japan | 55-20582 |

[51] Int. Cl.$^3$ ............................................. C08L 29/04
[52] U.S. Cl. .................................... 525/57; 525/63; 525/66; 525/78; 525/80; 525/88; 525/92; 525/94; 525/301
[58] Field of Search ............... 525/57, 301, 63, 66, 525/78, 80, 88, 92, 94

[56] References Cited

U.S. PATENT DOCUMENTS

| 3,549,727 | 12/1970 | Coates et al. | 525/57 |
| 3,845,163 | 10/1974 | Murch | 525/66 |
| 3,880,948 | 4/1975 | Compli | 525/66 |
| 3,972,961 | 8/1976 | Hammer et al. | 525/66 |
| 3,976,720 | 8/1976 | Hammer et al. | 525/66 |
| 4,017,557 | 4/1977 | Hammer et al. | 525/66 |
| 4,292,414 | 9/1981 | Suito et al. | 525/301 |

OTHER PUBLICATIONS

Encyclopedia of Polymer Science and Technology, vol. 13, pp. 396–397.

*Primary Examiner*—J. Ziegler
*Attorney, Agent, or Firm*—Birch, Stewart, Kolasch & Birch

[57] ABSTRACT

A thermoplastic polymer composition containing (i) a modified block copolymer of an aromatic vinyl compound and a conjugated diene compound, which is modified with a dicarboxylic acid or the derivative thereof, or the ionically crosslinked product of the modified block copolymer with a univalent, bivalent of trivalent metal ion and (ii) a thermoplastic polymer having a polar group. This thermoplastic polymer composition has excellent mechanical and other properties. The compatibility of each component in the thermoplastic composition is remarkably improved.

49 Claims, No Drawings

THERMOPLASTIC POLYMER COMPOSITION

The present invention relates to a novel thermoplastic polymer composition. More specifically, it relates to a thermoplastic polymer composition containing (i) a modified block copolymer of an aromatic vinyl compound and a conjugated diene compound, which is modified with a dicarboxylic acid or the derivative thereof, or the ionically crosslinked product thereof and (ii) a thermoplastic polymer having polar groups containing polar atoms, such as oxygen, nitrogen, sulfur and halogen atoms and, optionally, (iii) styrene polymers of polyolefins. This thermoplastic polymer composition has excellent properties including mechanical properties and the compatibility of each component in the thermoplastic polymer composition is remarkably improved.

Various polymer substances have heretofore been used as fibers, films, sheets, molded articles and the like. However, desired products having a desired property or properties cannot be obtained by the use of a single polymer substance. For this reason, various attempts to improve the processability of products, to adjust the balance of the physical properties of products or to lower the cost of products have been made by, for example, the combination of two or more polymer substances having different properties, the mixing or blending of various polymer substances together with low-molecular-weight substances or inorganic substances, or the laminating of two or more layers. However, in the case where various polymeric substances are mixed to prepare compositions, the compatibility of the different polymer substances to be mixed is not necessarily good. As a result, in many cases, the desired modification of certain polymer substances by these attempts cannot be readily obtained due to, for example, the non-uniformity or non-homogeneity and the delamination, based on the poor intermixing properties and compatibilities.

Copolymers of aromatic vinyl components and conjugated diene compounds, typically including styrene-butadiene block copolymers, are one of the polymer substances which are recently noted in the art. Among the styrene-butadiene block copolymers, those containing two or more polystyrene blocks and one or more polybutadiene blocks and having a relatively small styrene content have rubber elasticity similar to that of conventional vulcanized rubbers and also have moldability of processability similar to those of conventional thermoplastic plastic materials. Therefore, these styrene-butadiene block copolymers are widely used in the fields of, for example, molding materials, such as soling materials (for shoes), the modification of polystyrene resins and the like, adhesives, bonding agents and the like. On the other hand, styrene-butadiene block copolymers having a high styrene content are used, as a clear high-impact styrene resin, in the field of, for example, packaging materials.

The block copolymerss of aromatic vinyl compounds and conjugated diene compounds are useful by themselves and, also when they are mixed with, for example, styrene polymers and polyolefins, provide useful polymer compositions having desired properties. However, since these block compolymers are composed of only hydrocarbon monomers and since they are not compatible with other thermoplastic polymer substances, especially those containing a polar group in which a polar atom such as oxygen, nitrogen, sulfur or halogen atoms is contained, useful polymer compositions having desired properties cannot be obtained when these block copolymers are mixed with the above-mentioned other thermoplastic polymer substances.

Accordingly, an object of the present invention is to obviate the above-mentioned problems of the prior arts and to provide a thermoplastic polymer composition containing the block copolymer of the aromatic vinyl compound and the conjugated diene compound, in which the compatibility of the block copolymer with a thermoplastic polymer substance containing a polar group is improved and the properties, such as the impact resistance and the heat resistance thereof, are improved.

Other objects and advantages of the present invention will be apparent from the following description.

In accordance with the present invention, there is provided a thermoplastic polymer composition comprising:

(a) 1 through 99 parts by weight of a component A consisting essentially of at least one member selected from the group consisting of modified block copolymers and the ionically crosslinked products of at least one said modified block copolymer with at least one univalent, bivalent or trivalent metal ion, said modified block copolymer comprising a block copolymer of at least one aromatic vinyl compound and at least one conjugated diene compound onto which at least one molecular unit containing at least one dicarboxylic acid group or the derivative thereof is grafted; and (b) 99 through 1 parts by weight of a component B consisting essentially of at least one thermoplastic polymer having polar groups.

The above-mentioned thermoplastic polymers containing polar groups of the component B include polyamides, polyurethanes, vinylalcohol polymers, polyacrylates, polymethacrylates, chlorinated hydrocarbon polymers, ionomers and oligomers other than the above-mentioned polymers, said oligomers having at least one polar group which is reactive to the dicarboxylic acid or the derivative thereof and having a number-average molecular weight of 100 through 10,000.

In addition to the components A and B, the thermoplastic polymer composition of the present invention may optionally contain 0 through 100 parts by weight of at least one member selected from the group consisting of styrene polymers and polyolefins, based on 100 parts by weight of the total amount of the components A and B.

According to the present invention, since the modified block copolymers containing dicarboxylic acid groups or the derivatives thereof are used as the component A, the interaction of the component A with respect to the various thermoplastic polymers containing polar groups used as the component B is increased as, compared to the unmodified block copolymer. As a result, the mechanical and chemical properties of the present thermoplastic polymer compositions containing the components A and B are improved, compared to those of the compositions containing the unmodified block copolymers. Especially, when the thermoplastic polymers containing polar groups of the component B contain polar groups such as an amino group, hydroxyl group, epoxy group and isocyanate group, which can be reacted or interacted with the dicarboxylic acid groups or the derivatives thereof contained in the modified block copolymers or the ionically crosslinked dicarboxylic acid or the derivatives thereof contained in the ionically crosslinked modified block copolymers of the component A, the above-mentioned improvement effects are remarkably large. It should be noted that, as in those cases, the compositions containing the graft or block copolymers of the components A and B are also within the scope of the thermoplastic polymer compositions of the present invention.

As set forth above, the composition ratio of the component A to the component B in the present polymer compositions is within the range of from 1/99 to 99/1, more preferably 5/95 to 95/5, on a weight basis.

The properties of the present thermoplastic polymer compositions containing the components A and B and, optionally, the component C, may be widely varied depending on the composition ratio of the components A and B or A, B and C and the properties of the components A and B or A, B and C. However, according to the present invention, the properties of each component can be improved or modified by the combination of the components A and B or A, B and C.

For instance, when the present thermoplastic polymer compositions contain 50 through 99 parts by weight of the component A, relatively poor oil resistance and/or poor heat resistance of the component A can be improved by the addition of the polar component B. On the other hand, when the present thermoplastic polymer compositions contain 50 through 99 parts by weight of the component B, relatively poor impact resistance of the component B can be improved even by the addition of a relatively small amount of the component A, if the component B has a poor impact resistance. Furthermore, the present thermoplastic polymer composition of the components A and B can be used as a thermoplastic adhesive and also as a molding material in any compositions of the components A and B within the specified composition ratio. Although the various special characteristics of the present thermoplastic polymer compositions, which appear when the various polar polymer substances of the component B are used, are explained in detail hereinbelow, the effects due to the addition of the component A are more or less imparted to the component B. In addition, the modification of the properties of the present compositions can be effected even by the addition of a small amount of the component A, for example, 1 part by weight of the component A. This is an important advantage of the present invention.

The component A used in the present thermoplastic polymer composition is at least one member selected from the group consisting of block copolymers of aromatic vinyl compounds and conjugated diene compounds (which are referred to as "block copolymers" or "unmodified block copolymers" hereinbelow) onto which molecular units containing dicarboxylic acid groups or the derivatives thereof are grafted (the produced grafted polymers are referred to as "modified block copolymers" hereinbelow) and the ionically crosslinked products of the modified block copolymers with at least one univalent, bivalent or trivalent metal ion (which are sometimes referred to as "ionically crosslinked products" or "ionically crosslinked modified block copolymers" hereinbelow).

The block copolymers which are base polymers of the modified block copolymers can be typically prepared by an anionic polymerization in which lithium compounds are used as a polymerization catalyst. The content of the aromatic vinyl compounds in the block copolymers is generally within the range of from 5 to 95% by weight, preferably 10 to 90% by weight and, more preferably, 15 to 85% by weight. The block copolymers contain one or more, preferably two or more, of polymer blocks $\overline{A}$, which mainly contain aromatic vinyl compounds, and one or more of polymer blocks $\overline{B}$, which mainly contain conjugated diene compounds. The weight ratio $\overline{A}/\overline{B}$ of the polymer blocks $\overline{A}$ and $\overline{B}$ in the block copolymers is within the range of from 5/95 to 95/5, preferably 10/90 to 90/10. Among these block copolymers, those containing 70% by weight or less, preferably 60% by weight or less, of the aromatic vinyl compounds are rubberlike polymers and those containing more than 70% by weight of the aromatic vinyl compounds are resinous polymers. These conditions are maintained even after modification. Certain properties of the present thermoplastic polymer compositions also depend on the content of the aromatic vinyl compounds in the block copolymer.

The content of the aromatic vinyl compounds in the polymer blocks $\overline{A}$ of the block copolymers should be 60% by weight or more, preferably 80% by weight or more and, more preferably, 100% by weight and the content of the aromatic vinyl compounds in the polymer blocks $\overline{B}$ of the block copolymers should be 40% by weight or less, preferably 30% by weight or less. In the case where a minor component is present in each polymer block, the distribution of the minor component in the polymer block can be in the form of a tapered block (i.e. the content of the monomer component is gradually increased or decreased along the molecular chains), a partial block or any combination thereof. In the case where two or more of the polymer blocks are present in the block copolymer, they can be either in the same or in different structures.

The aromatic vinyl compounds used in the block copolymers include, for example, styrene, α-methylstyrene, vinyl toluene, p-tert.-butylstyrene and the like. The conjugated diene compounds used in the block copolymers include, for example, butadiene, isoprene, 1,3-pentadiene and the like. Preferable block copolymers used in the present invention are styrene-butadiene block copolymers.

The number-average molecular weights of the polymer blocks $\overline{A}$ and $\overline{B}$ are preferably within the range of from 1,000 to 300,000, more preferably 5,000 to 100,000 and the number-average molecular weight of the total block copolymer of the present invention is preferably within the range of from 10,000 to 500,000, more preferably 20,000 to 300,000. The molecular weight distribution (i.e. the ratio of the weight-average molecular weight to the number-average molecular weight) of the block copolymer of the present invention is preferably within the range of from 1.01 to 10, more preferably within 1.01 to 5. In the case where butadiene is used, as the conjugated diene compound, the 1,2-vinyl content in the micro structure of the butadiene portions of the block copolymers is preferably within the range of from 5 to 50%. Furthermore, the molecular structure of the block copolymers can be in the form of a linear structure, a branched structure, a radial type structure, which is obtained by the use of a polyfunctional coupling agent, or any combination thereof. The above-mentioned limitations of the polymer structure of the block copolymers are preferable conditions to obtain the desired effects of the present invention. The block copolymers having different structures can be used in any combination thereof.

The block copolymers used in the present invention are generally prepared from the anionic copolymerization of the aromatic vinyl compounds and the conjugated diene compounds in an inert inactive hydrocarbon solvent, such as hexane, cyclohexane, benzene, toluene and the like, in the presence of, as a polymerization catalyst, an organic lithium compound, such as butyl lithium. In the anionic copolymerization, the block copolymers having various structures can be obtained by changing the monomer addition method or order or by using a polyfunctional lithium compound. Furthermore, the micro structure of the conjugated diene portion of the block copolymer can be changed by the addition of a small amount of polar compounds, such as tetrahydrofuran, diethylene glycol dimethylether and the like. In addition, the block copolymers having active lithium terminal groups, obtained from the above-mentioned methods, can be reacted with polyfunctional coupling agents, such as carbon tetrachloride, silicon tetrachloride and the like, to produce branched or radial type block copolymers. However, it should be noted that the block copolymers of the aromatic vinyl compounds and the conjugated diene compounds derived from any other production processes can be used in the present invention, so long as the molecular structure of the block copolymers are within the range of the above-mentioned limitations.

Typical examples of the various structures of the block copolymers used in the present invention are as follow.

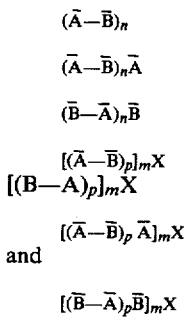

wherein A is a polymer block mainly containing the aromatic vinyl compound, B is a polymer block mainly containing the conjugated diene compound, X is a residual group of a polyfunctional coupling agent having two or more functional groups, n and p are, independently, integers of 1 or more and m is an integer of 2 or more.

The modified block copolymers according to the present invention can be prepared by the addition reaction of unsaturated dicarboxylic acids, or the derivatives thereof, to the above-mentioned base block copolymers. The dicarboxylic acids, or the derivatives thereof, are addition reacted or grafted to the conjugated diene portions of the block copolymers at the active unsaturated positions thereof. These dicarboxylic acids, or the derivatives thereof, should be grafted to the block copolymer in an amount such that one or more dicarboxylic acids, or the derivatives thereof, on an average, are grafted to each molecule of the block copolymers and also such that 0.05 through 20 parts by weight, preferably 0.1 through 10 parts by weight, of the dicarboxylic acids, or the derivatives thereof, based on 100 parts by weight of the base block copolymer, are grafted to the block copolymer. When the amount of the grafted molecular units derived from the dicarboxylic acids, or the derivatives thereof, is less than 0.05 parts by weight, the modification effects cannot be obtained, whereas, when the amount is more than 20 parts by weight, further improvement cannot be obtained.

Typical examples of the dicarboxylic acids, and the derivatives thereof, used in the present invention are maleic acid, fumaric acid, chloromaleic acid, itaconic acid, cis-4-cyclohexene-1,2-dicarboxylic acid, endo-cis-bicyclo [2,2,1]-5-heptene-2,3-dicarboxylic acid and the anhydrides, the esters, the amides and the imides thereof. Preferable dicarboxylic acids, and the derivatives thereof, are maleic acid, fumaric acid and maleic anhydride. The most preferable one is maleic anhydride.

The modified block copolymers used in the present invention can be obtained by reacting the above-mentioned base block copolymers with the dicarboxylic acids, or the derivatives thereof, in a molten state or in a solution with or without using a free-radical initiator. Although there is no limitation in the production processes of the modified block copolymers in the present invention, production processes which produce the modified block copolymers containing undesirable materials, such as gels or having a poor flowability, are not preferable for use in the present invention. For instance, as disclosed in the specification of prior co-pending application, U.S. Ser. No. 089,237, now U.S. Pat. No. 4,292,414, the modified block copolymers can be preferably produced in a manner such that the addition reaction can be conducted by using, for example, an extruder in a molten state under the condition that no substantial amount of free radicals is generated in the system by using a free-radical inhibitor.

Further, the ionically crosslinked products of the modified block copolymers with at least one univalent, bivalent or trivalent metal ion can be used as the component A of the present thermoplastic polymer compositions. These ionically crosslinked modified block copolymers especially improve the impact resistance of the component B of the present thermoplastic polymer compositions.

These ionically crosslinked modified block copolymers are obtained by crosslinking the modified block copolymers via ionic bondings with at least one metallic compound containing at least one univalent, bivalent or tribalent metal ion can be used as a crosslinking agent.

In the ionically crosslinked modified block copolymers, the dicarboxylic acid groups, or the derivatives thereof, are ionized by the addition of the crosslinking agent compounds. The ionization degree or amount of the dicarboxylic acid groups, or the derivatives thereof, can be controlled by the addition amount of the crosslinking agent compounds. The ionization amount can be determined by the use of, for example, an infrared spectrophotometer.

The addition amount of the crosslinking agent compounds is determined so that the partial or the total amounts of the dicarboxylic acid groups, or the derivatives thereof, contained in the modified block copolymers are theoretically ionized. The ionization reaction proceeds substantially quantitatively. However, an excess amount of the crosslinking agents may be preferably used to obtain the desired ionization amount. In order to effectively obtain the ionically crosslinked modified block copolymers, the molar ratio of the metal components in the metallic compounds (i.e. the crosslinking agent) to the dicarboxylic acid groups, or the derivatives thereof, contained in the modified block copolymers is preferably within the range of from 0.1 to 3.0.

The crosslinking agent compounds used for the production of the ionically crosslinked modified block copolymers include the compounds of metals of Groups I, II, III, IV and VIII, of the Periodic Table. These metallic compounds can be used alone or in any mixtures thereof. Typical examples of the crosslinking compounds are sodium compounds, potassium compounds, magnesium compounds, calcium compounds, zinc compounds, aluminum compounds and iron compounds. Preferable metallic compounds are hydroxides, oxides, alcoholates and carboxylates of the above-mentioned metals.

The ionically crosslinked products of the modified block copolymers can be prepared by various methods. For instance, the crosslinking agent compounds can be added to the molten modified block copolymers to effect the crosslinking reaction. Alternatively, the modified block copolymers are dissolved in an appropriate solvent and, then, the crosslinking agent compounds are added to the resultant solution to effect the crosslinking reaction. Furthermore, the crosslinking agent compounds can be added to the modified block copolymers in the form of a latex to effect the crosslinking reaction.

The above-mentioned modified block copolymers, and the ionically crosslinked products thereof, can be used as the component A of the present thermoplastic polymer compositions, alone or in any mixtures thereof.

The component B of the present thermoplastic polymer compositions will now be explained in detail hereinbelow.

As mentioned hereinabove, thermoplastic polymer substances having polar groups containing oxygen, nitrogen, sulfur and halogen atoms can be used as the component B of the present thermoplastic polymer compositions. Examples of the thermoplastic polymers having polar groups are: polyamides; polyurethane; vinylalcohol polymers; polyacrylates; polymethacrylates; chlorinated hydrocarbon polymers; ionomers; and oligomers, other than the above-mentioned polymers, having at least one polar group which is reactive to the dicarboxylic acid or the derivative thereof and having a number-average molecular weight of 100 through 10,000.

Each thermoplastic polymer having polar groups used as the component B in the present invention, as well as the unique advantages of each composition and the optimum conditions, will now be described in detail hereinbelow.

The polyamides used as the component B in the present invention are polymer substances having amide bonds in the molecule thereof, which include, for example, ring opening polymers of cyclic lactums, polycondensates of α-amino carbonic acids, polycondensates of dicarboxylic acids and diamines and copolymers of these monomers. Typical examples of the polyamides are nylon-6, nylon-11, nylon-12, nylon-6,6, nylon-6,10, copolymers of nylon-6 and nylon-6,6 coplymers of nylon-6 and nylon-12, copolymers of dimer acids and fatty diamines and the low-molecular weight compounds thereof. The polyamides obtained by any conventional production processes can be used in the present invention. The number-average molecular weight of these polyamides can be preferably within the range of from 100 to 30,000. The polyamides having various molecular weights and having different molecular structures can be used, depending upon the desired types of the compositions.

In the case where the component A is a main constituent of the present thermoplastic polymer compositions, the heat resistance, the oil resistance and the adhesive properties to polar materials of the component A can be advantageously improved by the blending of the polyamides. In this case, polyamides having various structures and having a wide range of molecular weight, such as from a relatively low molecular weight up to a high molecular weight, can be used. When the moldability and the processability of the composition are important, the use of the polyamides having a relatively low molecular weight or low melting point is desirable.

On the other hand, in the case where the polyamides are a main constituent of the present thermoplastic polymer compositions, the impact resistance of the polyamides, especially nylon-6 and nylon-6,6, which have a high crystallizability and a poor impact resistance, can be effectively improved by the use of the component A, especially the use of the ionically crosslinked modified block copolymers.

Furthermore, the thermoplastic polymer compositions containing the modified block copolymers and the polyamides, in any composition ratio, are suitable for use, as an adhesive composition, in the adhesion of, for example, polyamides with non-polar polymer substances, such as styrene polymers and olefin polymers, and various metals. The present thermoplastic polymer compositions containing polyamides can also be used as useful molding materials and modifiers for other thermoplastic polymer substances.

The polyurethanes which can be used as the component B in the present invention include polymer substances containing urethane bonds as the repeating unit in the molecule thereof. These polyurethanes are widely used as foams, adhesives, coating compositions, synthetic leathers and elastomers and are typically obtained from the polyaddition reaction of diisocyanates, polyols, polyamines, glycols and the like. The kinds of the polyurethanes are typically classified into casting type, blend type and thermoplastic type polyurethanes. Any type of the polyurethanes can be used as the component B in the present invention. However, among these polyurethanes, the thermoplastic type polyurethanes can be advantageously used in the present invention from the processing point of view.

The thermoplastic type polyurethanes can be divided into complete thermoplastic type polyurethanes and incomplete thermoplastic type polyurethanes, based on the synthetic conditions thereof. These two types are determined by the molar ratio of the hydroxyl (OH) groups contained in the starting bifunctional polyols and glycols and the isocyanate (NCO) groups contained in the starting diisocyanates. That is, the molar ratio (NCO/OH) of the complete thermoplastic type polyurethanes is approximately $0.95 < NCO/OH \leq 1$ and the molar ratio (NCO/OH) of the incomplete thermoplastic type polyurethanes is approximately $1 < NCO/OH < 1.1$.

Examples of the thermoplastic type polyurethanes are those containing, as soft segments, blocks of polyols (i.e. polyesters or polyethers) and diisocyanates and, as hard segments, blocks of diisocyanates and glycols.

The polyesterdiols used as the starting material in the production of the polyurethanes include, for example, poly(1,4-butyrene adipate), poly(1,6-hexane adipate), polycaprolactone and the like. Examples of the polyether diols are polyethylene glycol, polypropylene glycol, polyoxytetramethylene glycol and the like. Examples of the glycols are ethylene glycol, 1,4-butane diol, 1,6-hexane diol and the like.

The isocyanates used as the starting material in the production of the polyurethanes include aromatic, alicyclic and aliphatic isocyanates, such as, for example, tolylene diisocyanate, 4,4'-diphenylmethane diisocyanate, hexamethylene diisocyanate, isophorone diisocyanate and the like.

In addition to the above-mentioned thermoplastic type polyurethane elastomers, polyurethanes used as adhesive foams, coating compositions and the like have good compatibility with the modified block copolymers and the ionically crosslinked products thereof (i.e. the component A) and, therefore, can also be used as the component B in the present invention.

The number-average molecular weight of the thermoplastic type polyurethanes used as the component B in the present invention are preferably within the range of from 1,000 to 500,000, more preferably 10,000 to 300,000, from the point of view of the mechanical properties of the polymer compositions.

In the case where the polyurethanes are used, as the component B, in the present polymer compositions, the compatibility between the polyurethanes and the modified block copolymers in the compositions is improved. As a result, the modification in the properties of the compositions can be effectively improved by the blend of both components, compared to compositions in which the unmodified base block copolymers are used in lieu of the modified block copolymers. That is to say, when the compositions contain, as a main constituent, the polyurethanes, the poor hydrolytic stability of the polyurethanes can be improved in the compositions and, the flexibility is imparted to the polymer compositions by the use of the component A containing a small amount of the aromatic vinyl content, while the hardness is maintained in the compositions.

On the other hand, when the present polymer compositions contain, as a main constituent, the component A, the oil resistance, the abrasion resistance and the like are improved in the present compositions, compared to those of the unmodified base block copolymers and the compositions thereof containing the polyurethanes. Furthermore, as mentioned hereinabove, the present polymer compositions can also be useful as adhesives for metals and thermoplastic polymer substances and as modifiers for other thermoplastic polymer substances.

The vinyl alcohol polymers which can be used as the component B in the present invention include polymer substances having, in the molecular structure, a repeating unit containing vinyl alcohol. The vinyl alcohol polymers can be obtained by the partial or complete saponification of vinyl ester polymers, such as polyvinyl acetate, and olefin-vinyl ester copolymers, such as ethylene-vinyl acetate copolymers, and propylene-vinyl acetate copolymers by the use of alkaline compounds. Among these vinyl alcohol polymers, it is known that polyvinyl alcohol must be used, together with processing aids, plasticizers and/or water, in the processing thereof, since the melting point of the polyvinyl alcohol is close to the degradation temperature thereof.

Ethylene-vinyl copolymers are improved polymer substances in which the mechanical strength and the processability are improved, while the gas barrier properties, the antistatic properties and the oil resistance, which are characteristics of the polyvinyl alcohol, are maintained. These polymers are commercially available as, for example, "Eval" (manufactured by Kurare Co. Japan) and are widely used as films and sheets.

The ethylene-vinyl alcohol copolymers are generally derived from the corresponding ethylene-vinyl acetate copolymers. Preferable vinyl actate content in the ethylene-vinyl acetate copolymers is within the range of from 0.5 to 80 mol %. These copolymers are saponified to such a degree that 10 through 100 mol % of the vinyl acetate unit are saponified. Although various kinds of vinyl alcohol polymers and olefin-vinyl alcohol copolymers can be used in the present invention, ethylene-vinyl alcohol copolymers are preferably used from the point of view of the processability and the mechanical properties. However, other vinyl alcohols also have good compatibility with the component A of the present invention.

In the case where the present polymer compositions contain the vinyl alcohol polymers as a main constituent, preferably when the content of the component A is within the range of from 2 to 40% by weight, the impact resistance of the vinyl alcohol polymers is remarkably improved in the composition. As will be shown in the Example hereinbelow, in the case where the present polymer composition contains 75% by weight of ethylene-vinyl alcohol copolymer and 25% by weight of styrene-butadiene block copolymer modified with maleic anhydride, a remarkable improvement in the impact resistance is observed. That is, the izod impact strength of the composition is greater than 10 times that of the ethylene-vinyl alcohol copolymer. In addition, the addition of a small amount of the component A in these compositions improves the adhesiveness to various materials.

On the other hand, when the present compositions contain the component A as a main constituent, preferably when the content of the component A in the present polymer composition is 60% by weight or more, the mechanical strength, the oil resistance, the weathering resistance and the like of the modified block copolymers are improved in the composition by the addition of the component B. Furthermore, as mentioned hereinabove, the present polymer compositions containing, as the component B, the vinyl alcohol polymers can also be useful as adhesives for, for example, metals and thermoplastic resins, especially as adhesives between vinyl alcohol polymers and other materials, such as polyolefins, and as modifiers for other thermoplastic polymer substances.

The polyacrylates or polymethacrylates which can be used as the component B in the present invention include polymer substances mainly containing alkyl acrylates or alkyl methacrylates having alkyl groups of 1 to 12 carbon atoms. These polymer substances are usually called "acrylic resins" or "methacrylic resins". Generally speaking, the polyacrylates or polymethacrylates contain 50% by weight or more of alkyl acrylates or alkyl methacrylates. The polyacrylates or polymethacrylates can be generally produced by a radical polymerization method.

Examples of acrylic esters used in the production of the polyacrylates are methyl acrylate, ethyl acrylate, n-butyl acrylate, isobutyl acrylate, hexyl acrylate and (2-ethyl)hexyl acrylate. Examples of methacrylic esters used in the production of the polymethacrylates are methyl methacrylate, ethyl methacrylate and butyl methacrylate. Especially, polymethyl methacrylate or copolymers containing, as a main constituent, methyl methacrylate and a minor amount of methyl acrylate and/or butyl acrylate are useful as methacrylic resins and these polymer substances can be preferably used as the component B in the present invention. However, any other polyacrylates, polymethacrylates and the copolymers thereof can also be used as the component B in the present invention.

Furthermore, the polyacrylate or polymethacrylate polymer compositions in which other components having a low glass transition temperature are blended to modify the properties of the polyacrylates or the polymethacrylates, or the polyacrylate or polymethacrylate copolymers containing a minor amount of monomers, other than acrylates and methacrylates, such as ethylene, acrylic acid, methacrylic acid, styrene and maleic anhydride, can also be used as the component B in the present invention.

The number-average molecular weight of the polyacrylates or polymethacrylates used in the present invention is preferably within the range of from 500 to 1,000,000, more preferably 100,000 to 500,000.

In the case where the present polymer compositions contain, as a main constituent, 50% by weight or more, especially 60% by weight or more, of the polyacrylates or polymethacrylates (i.e. component B), the impact resistance of the component B is improved in the composition by the addition of the component A and the generation of cracks by solvents is also decreased. On the other hand, when the present polymer compositions contain, as a main constituent, the component A, especially when the content of the component A in the composition is more than 60% by weight, the heat resistance and the oil resistance of the component A are improved in the composition. Furthermore, as mentioned hereinabove, the present polymer compositions containing, as the component B, the polyacrylates or polymethacrylates can be also be useful as adhesives for various metals and thermoplastic polymer substances and as modifiers for other thermoplastic polymer substances.

The chlorinated hydrocarbon polymers (for chlorine containing hydrocarbon polymers) which can be used as the component B in the present invention include hydrocarbon polymer substances containing chlorine atoms in the molecules thereof. Examples of such chlorinated hydrocarbon polymers are: vinyl chloride homopolymers; copolymers of vinyl chloride and other monomers copolymerizable therewith, such as, vinyl chloride-vinylidene chloride copolymers, vinyl chloride-vinyl acetate copolymers, vinyl chloride-ethylene copolymers, vinyl chloride-acrylic esters copolymers, vinyl chloride-maleic esters copolymers; graft copolymers based on the above-mentioned chlorinated hydrocarbon hopolymers or copolymers; chlorinated polyolefins such as chlorinated polyethylene and chlorinated polypropylene; and the like. The preferable number-average molecular weight of these chlorinated hydrocarbon polymers is within the range of from 500 to 500,000, more preferably 10,000 to 200,000.

In the case where the chlorinated hydrocarbon polymers, especially polymers containing vinyl chloride, are used as the component B in the present invention, conventional plasticizers, such as dibutyl phthalate, dibutyl sebacate, diethyl carbonate, dibutylphenyl phosphate, dihexyl phthalate, dioctyl adipate, dioctyl phthalate, triphenyl phosphate, tricredyl phosphate and the like, can be added to the present polymer composition. The addition amount of the plasticizers is preferably within the range of from 1 to 100 parts by weight based on 100 parts by weight of the component B.

In the present polymer compositions containing the modified block copolymers (or the ionically crosslinked products thereof), as the component A and the chlorinated hydrocarbon polymers as the component B, the combatibility between the components A and B in the composition can be advantageously improved, as mentioned above.

In the case where the present polymer compositions contain, as a main constituent, the above-mentioned component A, preferably 60% by weight or more of the component A, the oil resistance and the fire retardance of the present composition are remarkably improved, compared to polymer compositions containing the unmodified base block copolymer and the chlorinated hydrocarbon polymers. On the other hand, when the present polymer compositions contain, as a main constituent, the above-mentioned component B, preferably 60% by weight or more of the component B, the impact resistance and the processability of the component B are improved in the compositions. Furthermore, as mentioned hereinabove. The present polymer composition containing the chlorinated hydrocarbon polymers as the component B, in any composition ratio, can also be useful as adhesives, especially adhesives for chlorine-containing polymers or polyurethanes and non-polar polyolefins or styrene polymers, and as modifiers for other thermoplastic polymer substances.

The ionomers which can be used as the component B in the present invention are ionically crosslinked polymer substances in which base copolymers of $\alpha,\beta$-unsaturated carboxylic acids and other monomers copolymerizable threwith are ionically crosslinked with at least one metallic ion selected from the group consisting of univalent, bivalent and trivalent metallic ions.

Typical examples of the base copolymers are those derived from (i) non-polar monomers such as olefins (e.g. ethylene, propylene, butene and the like) and styrene, and (ii) $\alpha,\beta$-unsaturated monocarboxylic acids such as acrylic acid, methacrylic acid and the like, and-/or $\alpha,\beta$-unsaturated dicarboxylic acids such as maleic acid. Preferable base polymers are olefin-unsaturated carboxylic acid copolymers, especially containing 50 mol % or more of olefins and 0.2 through 25 mol % of $\alpha,\beta$-unsaturated carboxylic acids.

As disclosed in, for example, U.S. Pat. No. 3,264,272, the ionomers can be obtained by the reaction of the above-mentioned base polymers, for example, olefin-$\alpha,\beta$-unsaturated carboxylic acid copolymers, with metallic compounds containing univalent, bivalent or trivalent metals. The metallic compounds are generally used in an amount such that 10 through 100 mol % of the carboxylic acid groups contained in the base polymers are neutralized and ionically crosslinked with the metal ions.

Typical examples of the olefin-$\alpha,\beta$-unsaturated carboxylic acid copolymers are ethylene-acrylic acid copolymer, ethylene-methacrylic acid copolymer, ethylene-itaconic acid copolymer, ethylene-maleic acid copolymer, ethylene-arcylic acid-methacrylic acid copolymer and ethylen-propylene-methacrylic acid copolymer. The most preferable base polymer is ethylene-acrylic acid copolymer or ethylene-methacrylic acid copolymer.

The metal ions used in the formation of the above-mentioned ionomers include univalent, bivalent and trivalent ions of the metals belonging to the Groups I, II, III, IV-A and VIII of the Periodic table. Typical examples of the metal ions are univalent metal ions such as $Na^+$, $Li^+$, $K^+$, $CS^+$, $Ag^+$ and the like, bivalent metal ions such as $Mg^{2+}$, $Ca^{2+}$, $Ba^{2+}$, $Zn^{2+}$, $Sr^{2+}$, $Hg^{2+}$, $Fe^{2+}$ and the like, and trivalent metal ions such as $Al^{3+}$, $Fe^{3+}$ and the like. These metal ions can be reacted with the base polymers, in the form of, for example, hydroxides, alcohlates and lower carboxylic acid groups.

Furthermore, the above-mentioned ionomers used in the present invention can be prepared by the saponification of the olefin-$\alpha,\beta$-unsaturated carboxylic acid ester copolymers, such as ethylene-methyl methacrylates copolymer and ethylene-methyl acrylate copolymer, with the hydroxides of univalent, bivalent and trivalent metals, and also, by the partial neutralization of the saponified base polymers. In the latter case, carboxylic acid groups are partially contained in the resultant ionomers. Commercially available ionomers, such as "Surlyn®" (Du Pont) and "Copolene®" (Asahi Dow, Japan), can also be used in the present invention.

The above-mentioned ionomers can be used alone or in any mixtures thereof. In the case where the ionomers are used as the component B in the present polymer compositions, since the metal ions contained in the component B are reacted with the dicarboxylic acid groups or the derivatives thereof contained in the modified block copolymers (i.e. the component A) by the mixing of the components A and B, the compatibility of the components A and B in the present polymer compositions is remarkably improved. This co-ionic crosslinking between the components A and B can be readily detected by an infrared spectrophotometer.

In addition, when the ionically crosslinked modified block copolymers are used as the component A in the present polymer compositions, the hardness and the tensile strength of the compositions are further improved, and therefore, extremely tough materials can be obtained.

In the case where the present polymer compositions contain the component A as a main constituent, preferably 1 through 40% by weight of the component A, the heat-sealing properties, the abrasion resistance and, especially, the oil resistance, of the block copolymer are improved.

Furthermore, as mentioned hereinabove, the present polymer compositions, in any composition ratio, have good adhesive or bonding properties to various materials such as metals, various thermoplastic polymers and paper, and therefore, can be used as laminating layers or adhesive layers in laminates of the above-mentioned various materials. Especially, the high water resistance of the present polymer compositions is effective for use in the production of the laminates.

In addition, the present polymer compositions are useful as molding or processing materials by themselves and, also, useful as modifiers for other thermoplastic polymer substances.

The oligomers having polar groups, which can be used as the component B in the present invention, include oligomers of thermoplastic polymers, other than the above-mentioned polymers, having polar groups which are reactive to the dicarboxylic acids or the derivatives thereof contained in the component A. The number-average molecular weight of the oligomers is preferably within the range of from 100 to 10,000, more preferably 500 to 5000.

Typical examples of the reactive polar groups contained in the oligomers are an amino group, a hydroxyl group, an epoxy group, an isocyanate group and the like. These reactive polar groups are reacted with the molecular units containing the dicarboxylic acid groups or the derivatives thereof contained in the component A to form the reaction products of the components A and B. The polymer compositions of the present invention desirably contain these reaction products of the components A and B.

The reaction products of the components A and B include: graft copolymers comprising the component A, as a backbone component, and the component B, as a superstrate component, grafted onto the component A; crosslinked polymers comprising the component A crosslinked with the component B, and; mixtures thereof. These reaction products of the components A and B can be obtained by adjusting the number of the reactive polar groups contained in the component B or adjusting the mol ratio of the reactive polar groups contained in the component B to the functional groups contained in the component A. Among these reaction products, those containing the graft copolymers are preferably used, and only the graft copolymers are more preferably used, in the present invention. In order to prepare the graft copolymers of the components A and B, the use of the oligomers having one reactive polar group in each molecule thereof, more preferably, one reactive polar group as one of the terminal groups in one molecule, is effective.

Typical examples of the oligomers used as the component B in the present invention are: conjugated diene type oligomers such as amine-terminated conjugated diene type oligomers, hydroxy-terminated conjugated diene type oligomers, isocyanated conjugated diene type oligomers, epoxidized conjugated diene type oligomers and the like, which can be derived from conjugated diene oligomers such as 1,2-polybutadienes, 1,4-polybutadienes, butadiene-acrylonitrile copolymers, polychloroprenes and the like; polyether type oligomers such as polyethylene glycols, polypropylene glycols, polybutyrene glycols and mono- or di-esters thereof and the like; polyisocyanate oligomers; polyethylene imine oligomers; glycidyl methacrylate copolymer type oligomers. Examples of the most preferable oligomers having the reactive polar group in one end of the molecules thereof are alkyl, aryl or aralkyl ethers of dihydroxyl oligomers (e.g. dihydroxyl polyethers) having a hydroxyl group in one end of the molecules thereof and oligomers having an ioscyanate group in one end of the molecules thereof.

Furthermore, the oligomers having more than one reactive polar group in one molecule thereof can also be used for the preparation of the present polymer compositions, so long as the oligomers having an excess amount of the reactive polar groups with respect to the functional groups contained in the modified block copolymers are used under certain reaction conditions.

The above-mentioned various oligomers can be used alone or in any mixtures thereof in the present invention.

The composition ratio of the component A and the component B (i.e. the oligomers) can be widely varied depending upon, for example, the mole ratio of the reactive groups contained in the components A and B, in accordance with the application purpose of the polymer compositions. However, in order to obtain the polymer compositions having desirable properties, 0.5 through 100 parts by weight, more preferably 1 through 50 parts by weight, of the component B (i.e. the oligomers), based on 100 parts by weight of the component A can be preferably used in the present invention. If the amount of the component B is too large, the properties of the resultant compositions, for example the mechanical strength, are unpreferably decreased. It should be noted that the present polymer compositions can contain the unreacted component A and/or the unreacted component B. These compositions are obtained in the case where an excess amount of either the component A or B is used or where both the components A and B remain in the system because the reaction of the components A and B does not completely take place. Even in these cases, the polymer compositions having the desirable properties can be obtained. In addition, the by-products produced by the reaction of the components A and B (e.g. water is formed by the esterification reaction of the dicarboxylic acid group and the hydroxyl group) and the unreacted components A and/or B may be removed from the present polymer composition in any known manner.

The characteristics of the present polymer compositions containing the oligomers as the component B can be readily controlled by adjusting the composition ratio of the components A and B, the content of the aromatic vinyl compounds in the component A, the kind of the oligomers of the component B and the like. In any case, desirable characteristics which are not possessed by the corresponding modified block copolymers, for example, the compatability with polar high-molecular weight polymers, the oil resistance, the processability, the surface characteristics and/or the abrasion resistance are imparted to the polymer compositions.

The thermoplastic polymers which can be optionally used as the component C in the present invention include styrene polymers and olefin polymers. The component C can optionally be incorporated into the present polymer compositions containing the components A and B to improve the processability of the composition. The amount of the component C is preferably 100 parts by weight or less, more preferably 1 to 50 parts by weight, based on 100 parts by weight of the total amount of the components A and B. Examples of the styrene polymers are those containing 50% by weight or more of styrene, such as polystryene, styrene-α-methylstyrene copolymers, butadiene-styrene block copolymers, rubber modified high impact polystyrenes, acrylonitrile-styrene copolymers, styrene-methacrylic ester copolymers, styrene-maleic anhydride copolymers, acrylonitrile-butadiene-styrene copolymers, acrylic acid ester-butadiene-styrene copolymers, methacrylic ester-butadiene-styrene copolymers and mixtures thereof.

The olefin polymers are polymer substances containing 50% by weight or more of an olefin monomer unit containing ethylene, propylene, butene and the like. Typical examples of such polymers are low-density polyethylene, high density polyethylene, polypropylene, polybutene, ethylene-propylene copolymers, ethylene-vinyl acetate copolymers and the like.

The component C optionally used in the present invention may be added to the present polymer compositions in a manner such that the component C is added to the mixture of the components A and B after the blending of the components A or B or that the component C is previously added to the component A or B before the blending of the components A and B. Especially when polymers having a relatively high processing temperature are used as the component B, the blending of the components B and C prior to the blending of the components A and B is desirable from the processing point of view.

The polymer compositions of the present invention can further contain other conventional additives. Examples of such additives are reinforcing materials such as silica, carbon blacks, clays, glass fibers, organic fibers, calcium carbonate and the like, as well as fillers, antioxidants, UV absorbers, pigments, lubricants, fire retardants and other additives. Especially, when 150 parts by weight or less, preferably 10 through 100 parts by weight, of the glass fibers, based on 100 parts by weight of the thermoplastic polymer compositions of the present invention, are incorporated into the present compositions, the stiffness, the heat resistance and the mechanical strengths are improved to present molding or processing materials having excellent properties. Glass fibers having a diameter of 2 through 20 microns and a length of 50 through 20,000 microns, which are conventionally used in the reinforcement of resins, can be advantageously used in the present invention.

The thermoplastic polymer compositions of the present invention can be readily prepared by using any conventional mixing apparatus which is usually used for mixing or blending of polymer substances. Examples of such apparatus are single or multiple screw extruders, mixing rolls, Banbury mixers, kneaders and the like. Although the mixing or blending of the present polymer composition can be preferably effected in the molten state, the mixing can be also effected by using the solution of each component, followed by the removal of the solvents in any known manner.

The polymer compositions of the present invention can be readily molded or formed into various kinds of useful articles by using any conventional molding or forming techniques, including extrusion molding, injection molding, blow molding, pressure forming, rotational molding and the like. Examples of the articles are sheets, films, foamed products as well as injection-molded articles, blow-molded articles, pressure-formed articles and rotational-molded articles having various kinds of shapes. These articles can be used in the fields of, for example, automobile parts, electrical parts, mechanical parts, footwear, medical equipment and accessories, packaging materials, building materials and the like. Furthermore, the polymer compositions of the present invention are suitable for use, in the form of solutions, in the fields of adhesives, surface coating compositions, sealing agents and the like.

The present invention will now be further illustrated by, but is by no means limited to, the Examples set forth below.

In the Examples set forth below, modified block copolymers, in which the commercially available styrene-butadiene block copolymers shown in Table 1 as base block copolymers and, further, styrene-butadiene block copolymers shown in Tables 2 and 3, which were experimentary prepared, as base block copolymers, were modified with maleic anhydride were employed. In the comparative Examples, the unmodified styrene-butadiene block copolymers shown in Tables 1 to 3 were employed.

Furthermore, a process for producing modified block copolymers obtained from the grafting of the maleic anhydride onto the styrene-butadiene block copolymers and employed in the Examples are shown in the Modified Block Copolymer Production Examples below.

TABLE 1

Commercial Styrene-Butadiene Block Copolymer

| Sample No. | Trade Name | Styrene Content (wt %) | Melt Flow[1] Index (g/10 min) | Manufacturer |
|---|---|---|---|---|
| SB-1 | Tufprene A | 40 | 11.0 | Asahi Chemical Industry |
| SB-2 | Solprene T-414 | 40 | 5.3 | Japan Elastomer Company |
| SB-3 | Asaprene T-431 | 30 | 10.3 | Japan Elastomer Company |
| SB-4 | KR-01 | 80 | 5.3 | Phillips Petroleum Company |

[1]JIS-K-6870, 200° C., 5 kg

TABLE 2

$B_1$—$S_1$—$B_2$—$S_2$ Type Styrene-Butadiene Block Copolymer

| Sample No. | Styrene Content (wt %) | Block Styrene Content (wt %) | $Mw^1$ | $Mn^2$ | Melt Flow[3] Index (g/10 min) | Polymer Structure |
|---|---|---|---|---|---|---|
| SB-5 | 40 | 33 | 72,000 | 55,000 | 22.5 | $B_1$ = 15 wt % [B]/[S] = 12/3 (tapered)<br>$S_1$ = 17 wt % [B]/[S] = 0/17<br>$B_2$ = 52 wt % [B]/[S] = 48/4 (tapered)<br>$S_2$ = 16 wt % [B]/[S] = 0/16 |
| SB-6 | 42 | 37 | 81,000 | 62,000 | 12.1 | $B_1$ = 16 wt % [B]/[S] = 14/2 (tapered)<br>$S_1$ = 19 wt % [B]/[S] = 0/19<br>$B_2$ = 47 wt % [B]/[S] = 44/3 (tapered)<br>$S_2$ = 18 wt % [B]/[S] = 0/18 |
| SB-7 | 38 | 33 | 79,000 | 61,000 | 11.0 | $B_1$ = 18 wt % [B]/[S] = 16/2 (tapered)<br>$S_1$ = 17 wt % [B]/[S] = 0/17<br>$B_2$ = 49 wt % [B]/[S] = 46/3 (tapered)<br>$S_2$ = 16 wt % [B]/[S] = 0/16 |

Remarks:
Bn—Polymer block composed chiefly of butadiene.
Sn—Polymer block composed chiefly of styrene. Integer n represents the order along the molecular chain.
[B]—Butadiene content
[S]—Styrene content
[1]Mw: Weight average molecular weight
[2]Mn: Number average molecular weight
[3] JIS-K-6870, 200° C., 5 Kg

TABLE 3

$S_1$—$B_1$—$S_2$ Type Styrene-Butadiene Block Copolymer

| Sample No. | Styrene Content (wt %) | Block Styrene Content (wt %) | Melt Flow Index (g/10 min) | Polymer Structure | |
|---|---|---|---|---|---|
| SB-8 | 80 | 80 | 4.2 | $S_1$ = $S_2$ = 40 wt % | [B]/[S] = 0/40 |
| | | | | $B_1$ = 20 wt % | [B]/[S] = 20/0 |
| SB-9 | 80 | 80 | 7.2 | $S_1$ = $S_2$ = 40 wt % | [B]/[S] = 0/40 |
| | | | | $B_1$ = 20 wt % | [B]/[S] = 20/0 |
| SB-10 | 74 | 74 | 8.4 | $S_1$ = $S_2$ = 37 wt % | [B]/[S] = 0/37 |
| | | | | $B_1$ = 26 wt % | [B]/[S] = 26/0 |

MODIFIED BLOCK COPOLYMER PRODUCTION EXAMPLES 0.8 parts by weight of maleic anhydride, 0.3 part by weight of BHT (butylhydroxytoluene) and 0.2 part by weight of phenothiazine which serves as a gellation preventing agent were added to 100 parts by weight of the styrene-butadiene block copolymer (SB-5), and the mixture was homogeneously blended together using a mixer. The mixture was supplied to a single screw extruder (full-flighted screw, screw diameter (D)=20 mm, L/D=24) in a nitrogen atmosphere at a cylinder temperature of 190° to 210° C., to subject the mixture to the modification reaction. From the resulting polymer was removed the unreacted maleic anhydride under reduced pressure. The modified block copolymer (M-5a) thus obtained has a melt index (JIS-K-6870, load of 5 kg, temperature of 200° C.) of 18.2 g/10 min., a grafted amount of maleic anhydride of 0.25% by weight and a toluene-insoluble component of 0.05% by weight.

A variety of modified block copolymers shown in Table 4 were obtained from other styrene-butadiene block copolymers using the same extruder in a manner as described above. The results of analysis of these samples are shown in Table 4.

TABLE 4

| Sample No. of Modified Block Copolymer | Base Block Copolymer | | | Modified Block Copolymer | |
|---|---|---|---|---|---|
| | Sample No. | Type | Styrene Content (wt %) | Amount of Maleic[1] Anhydride Combined (parts by weight) | Melt Flow[2] Index (g/10 min) |
| M-1a & 1b | SB-1 | Commercial | 40 | 1.10 | 7.8 |
| M-2a | SB-2 | Commercial | 40 | 0.52 | 3.8 |
| M-2b | SB-2 | Commercial | 40 | 0.51 | 4.7 |
| M-3a | SB-3 | Commercial | 30 | 0.42 | 9.0 |

TABLE 4-continued

Modified Block Copolymer

| Sample No. of Modified Block Copolymer | Base Block Copolymer | | | Modified Block Copolymer | |
|---|---|---|---|---|---|
| | Sample No. | Type | Styrene Content (wt %) | Amount of Maleic[1] Anhydride Combined (parts by weight) | Melt Flow[2] Index (g/10 min) |
| M-4a | SB-4 | Commercial | 78 | 1.10 | 4.1 |
| M-5a | SB-5 | $B_1$—$S_1$—$B_2$—$S_2$ | 40 | 0.25 | 18.2 |
| M-6a | SB-6 | $B_1$—$S_1$—$B_2$—$S_2$ | 42 | 0.53 | 9.3 |
| M-7a | SB-7 | $B_1$—$S_1$—$B_2$—$S_2$ | 38 | 0.70 | 7.3 |
| M-8a | SB-8 | $S_1$—$B_1$—$S_2$ | 80 | 0.86 | 3.1 |
| M-8b | SB-8 | $S_1$—$B_1$—$S_2$ | 80 | 1.20 | 3.3 |
| M-9a | SB-9 | $S_1$—$B_1$—$S_2$ | 80 | 0.93 | 5.3 |
| M-10a | SB-10 | $S_1$—$B_1$—$S_2$ | 74 | 0.70 | 6.6 |

[1] Based on 100 parts by weight of block copolymer
[2] JIS-K-6870, 200° C., 5 kg

EXAMPLES 1-1, 1-2 AND COMPARATIVE EXAMPLE 1-1

The compositions of Example 1-1 (using M-5a), Example 1-2 (using M-5c) and Comparative Example 1-1 (using SB-5) were obtained by kneading polymers shown in Table 6, using a Brabender Plastograph, at 220° C. for 10 minutes. Namely, in Example 1-1 a modified block copolymer M-5a was employed as component A and in Example 1-2 an ionically crosslinked product of M-5a was employed. The ionically crosslinked product M-5c was obtained by adding a mixture solvent solution of toluene and methanol of sodium methylate ($CH_3ONa$) to a toluene solution containing 20% of M-5a in such an amount that $CH_3ONa$/acid anhydride = 0.6 (in molar ratio), to react the mixture at room temperature, followed by the removal of the solvent. The ionic crosslinking was confirmed by the infrared spectrum), and in Comparative Example 1-1 an unmodified block copolymer SB-5 was employed as a component A, and nylon-6 (number-average molecular weight of 18,000), which was a polar group-containing thermoplastic polymer, was employed as a component B. The physical properties of compression molded products obtained from these compositions are shown in Table 5.

It will be obvious from Table 5 that compositions obtained by using the modified block copolymer of Example 1-1 and the ionically crosslinked product of the modified block copolymer of Example 1-2, exhibit improved tensile strength, heat resistance and oil resistance, as compared with the composition obtained by using the unmodified block copolymer of Comparative Example 1-1.

TABLE 5

| | Example No. | | |
|---|---|---|---|
| Item | Example 1-1 | Example 1-2 | Comparative Example 1-1 |
| Composition: | | | |
| Modified block copolymer (M-5a) (parts by weight) | 70 | 0 | 0 |
| Ionically crosslinked product (M-5c) (parts by weight) | 0 | 70 | 0 |
| Unmodified block copolymer (SB-5) (parts by weight) | 0 | 0 | 70 |
| Nylon-6 (parts by weight) | 30 | 30 | 30 |
| Physical Properties: | | | |
| 25° C.: Hardness (JIS) | 94 | 96 | 93 |
| Tensile strength (kg/cm$^2$) | 190 | 207 | 80 |
| 300% Modulus (kg/cm$^2$) | 170 | 179 | 72 |
| Elongation at break (%) | 390 | 390 | 350 |
| 50° C.: Tensile strength (kg/cm$^2$) | 95 | 106 | 31 |
| 70° C.: Tensile strength (kg/cm$^2$) | 60 | 72 | 12 |
| Oil resistance, increase in volume (oil No. JIS 3, at 23° C. for 22 hours) (%) | 27 | 20 | 42 |
| Transparency, Haze (%) | 12.0 | 13.6 | 62.5 |

EXAMPLES 2-1, 2-2 AND COMPARATIVE EXAMPLE 2-1

The compositions of Example 2-1 (using M-5a), Example 2-2 (using M-5c) and Comparative Example 2-1 (using SB-5) were obtained by blending the modified block copolymer (M-5a), the ionically crosslinked product (M-5c) of the modified block copolymer (M-5a) and the unmodified block copolymer (SB-5) as component A, and the nylon-6 used in Example 1-1 as component B, at ratios shown in Table 6, using an extruder (L/D=28) of a size of 30 mm, followed by the pelletization. These compositions were injection-molded, and their physical properties are shown in Table 6. For the purpose of reference, the physical properties of a sample obtained by injection-molding the nylon-6 are also shown in Table 6.

As will be obvious from Table 6, the compositions obtained using the modified block copolymer of Example 2-1 and using the ionically crosslinked product of Example 2-2 exhibit greatly improved Izod impact strength, which results from the nylon-6, as compared with the composition of Comparative Example 2-1, which employs the unmodified block copolymer.

TABLE 6

| Item | Example 2-1 | Example 2-2 | Comparative Example 2-1 | Reference Example |
|---|---|---|---|---|
| Composition: | | | | |
| Modified block copolymer (M-5a) (parts by weight) | 20 | 0 | 0 | 0 |
| Ionically crosslinked product (M-5c) (parts by weight) | 0 | 20 | 0 | 0 |
| Unmodified block copolymer (SB-5) (parts by weight) | 0 | 0 | 20 | 0 |
| Nylon-6 (parts by weight) | 80 | 80 | 80 | 100 |
| Physical Properties: (at 25° C.) | | | | |
| Izod impact strength (kg cm/cm, with notch) | 11.6 | 13.5 | 5.6 | 3.5 |
| Tensile strength (kg/cm$^2$) | 580 | 596 | 450 | 760 |
| Elongation (%) | 110 | 105 | 60 | 130 |
| Transparency, Haze (%) | 14.3 | 16.4 | 55.2 | — |

EXAMPLES 3-1, 3-2, 3-3 AND COMPARATIVE EXAMPLE 3-1, 3-2

The resinous modified block copolymer (M-8a), and the ionically crosslinked product (M-8c) of the copolymer (M-8a) were used as component A. The ionically crosslinked product M-8c was obtained by adding magnesium acetate (tetrahydrate) in an amount of 0.4 mole with respect to acid anhydride groups contained in M-8a, to the M-8a which was melted by a mixing roll heated at 180° C. For the purpose of comparison, the unmodified block copolymer (SB-8) was used as component A, and the nylon-6 used in Example 1-1 was used as component B. The compositions shown in Table 7 were obtained by kneading the above-mentioned components by using a Brabender Plastograph at 220° C. The physical properties of the compression molded products of these compositions are shown in Table 7.

As will be obvious from Table 7, the compositions obtained by using the modified block copolymer of Example 3-1 and the ionically crosslinked product of Example 3-2, exhibit excellent physical properties, as compared with the composition of Comparative Example 3-1, which employs the unmodified block copolymer. Furthermore, in Example 3-3 a composition consisting of the composition of Example 3-1 admixed with a high impact polystyrene (Styron-475 D, a product of Asahi Dow Co.) was employed, and in Comparative Example 3-2 a composition consisting of the composition of Comparative Example 3-1 admixed with the high-impact polystyrene was employed. The composition of Example 3-3, in which the modified block copolyer was employed, exhibits excellent physical properties compared with those of the composition of Comparative Example 3-2.

TABLE 7

| Item | Example 3-1 | Example 3-2 | Comparative Example 3-1 | Example 3-3 | Comparative Example 3-2 |
|---|---|---|---|---|---|
| Composition: | | | | | |
| Component A: Modified block copolymer (M-8a) (parts by weight) | 70 | 0 | 0 | 70 | 0 |
| Ionically crosslinked product (M-8c) (parts by weight) | 0 | 70 | 0 | 0 | 0 |
| Unmodified block copolymer (SB-8) (parts by weight) | 0 | 0 | 70 | 0 | 70 |
| Component B: Nylon-6 (parts by weight) | 30 | 30 | 30 | 30 | 30 |
| Component C: High impact polystyrene (parts by weight) | 0 | 0 | 0 | 15 | 15 |
| Physical Properties: (at 25° C.) | | | | | |
| Izod impact strength (kg · cm/cm, with notch) | 4.0 | 4.6 | 2.3 | 4.7 | 2.5 |
| Tensile strength (kg/cm$^2$) | 340 | 360 | 260 | 335 | 245 |
| Elongation at break (%) | 20 | 19 | 13 | 17 | 12 |
| Transparency, Haze (%) | 15.0 | 15.8 | 48.0 | 22.6 | 51.5 |

EXAMPLES 4-1, 4-2, 4-3 AND COMPARATIVE EXAMPLES 4-1, 4-2, 4-3

The compositions shown in Table 8 were prepared by kneading the modified block copolymer M2a as component A, the unmodified block copolymer SB2 as component A for comparison, and polymaides such as nylon-6/nylon-6,6 copolymer (nylon-6 content of 70%, number-average molecular weight of 20,000), nylon-12 (Rilsan ®AMNO, a product of ATO Chemie Co.), and nylon-11 (Rilsan ®BMNO, a product of ATO Chemie Co.) as component B, using a Brabender plastograph at 220° C. Table 8 shows the measured results of the impact strength of the compression molded products of these compositions.

It will be understood that the compositions of Examples 4-1, 4-2 and 4-3, employing the modified block copolymer, exhibit improved impact resistance as compared with the compositions of Comparative Examples 4-1, 4-2 and 4-3, which employ the unmodified block copolymer.

TABLE 8

| Item | Example 4-1 | Comparative Example 4-1 | Example 4-2 | Comparative Example 4-2 | Example 4-3 | Comparative Example 4-3 |
|---|---|---|---|---|---|---|
| Composition: | | | | | | |
| Modified block copolymer (M-2a) (parts by weight) | 25 | 0 | 20 | 0 | 25 | 0 |
| Unmodified block copolymer (SB-2) (parts by weight) | 0 | 25 | 0 | 20 | 0 | 25 |
| N-6/N-6,6 copolymer (parts by weight) | 75 | 75 | 0 | 0 | 0 | 0 |
| Nylon-12 (parts by weight) | 0 | 0 | 80 | 80 | 0 | 0 |
| Nylon-11 (parts by weight) | 0 | 0 | 0 | 0 | 75 | 72 |
| Izod impact strength (kg · cm/cm, with notch) | 9.5 | 4.3 | 7.8 | 3.1 | 9.4 | 3.2 |

EXAMPLE 5-1

A composition was prepared by kneading a polycaprolactam oligomer having terminal amino groups (an oligomer which has a number-average molecular weight of 950 based on the analysis of terminal amino groups, and which was obtained by polymerizing an ε-caprolactam with an n-butylamine as a molecular weight controlling agent) and a modified block copolymer (M-7b) at a ratio as shown in Table 9, using a Brabender plastograph, at 200° C., for 5 minutes. The composition was transparent and the reaction of acid anhydride groups in the modified block copolymer with the amino-terminated oligomer was confirmed as analyzed by means of an infrared spectrophotometer.

Table 9 shows physical properties of the composition of Example 5-1. It will be understood that the composition of Example 5-1 exhibits improved mechanical properties and oil resistance, as compared with the block copolymer (SB-7) of the Reference Example.

type polyurethane, and PARAPRENE P-22SM (a product of Nippon Polyurethane Co.), which is a complete thermoplastic type polyurethane, by using a mixing roll heated at 180° C. The properties of the compression molded products of these compositions were measured. The tensile strength retaining factor was also measured after the products were immersed in hot water maintained at 80° C. for 30 days, to study the resistance against hydrolysis. The ionically crosslinked product M-6b used in Example 6-3 was obtained by adding sodium methylate to the modified block copolymer M-6a in an amount of 0.5 mole based on the acid anhydride groups contained in the copolymer M-6a.

As will be obvious from Table 10, the hardness of the compositions of Examples 6-1 to 6-3 is identical to that of the polyurethanes of the Reference Examples, and the decrease in the tensile strength of the present composition from the tensile strength of the polyurethane is not large. The 300% modulus was small, indicating increased flexibility. On the other hand, when the un-

TABLE 9

| Item | Example 5-1 | Reference Example |
|---|---|---|
| Composition: | | |
| Modified block copolymer (M-7a) (parts by weight) | 100 | 0 |
| Unmodified block copolymer (SB-7) (parts by weight) | 0 | 100 |
| Amino-terminated oligomer (parts by weight) | 12.6 | 0 |
| Physical Properties: | | |
| Hardness (JIS) | 86 | 80 |
| 300% Modulus (kg/cm$^2$) | 33 | 21 |
| Tensile strength | 195 | 143 |
| Elongation at break (%) | 900 | 1,050 |
| Oil Resistance (rate of weight increase) (%) | 40 | 174 |
| Melt index (g/10 min.) | 3.1 | 11.0 |

EXAMPLES 6-1, 6-2, 6-3, AND COMPARATIVE EXAMPLES 6-1, 6-2

Compositions were prepared by using the modified block copolymer M-6a and the unmodified block copolymer SB-1 at ratios shown in Table 10, as well as ELASTOLLAN E 185FNAT (a product of Nippon Elastollan Co.), which is an incomplete thermoplastic modified block copolymer was used as in Examples 6-1 and 6-2, increased flexibility was exhibited but the tensile strength was greatly decreased. Further, use of the modified block copolymer improves the resistance against hydrolysis as compared with the compositions which employ polyurethanes or the unmodified block copolymer.

TABLE 10

| Item | Example 6-1 | Example 6-2 | Example 6-3 | Comparative Example 6-1 | Comparative Example 6-2 | Reference Example | Reference Example | Reference Example |
|---|---|---|---|---|---|---|---|---|
| Blending Ratio of Compositions: | | | | | | | | |
| Component B: | | | | | | | | |
| Type | ELASTOLLAN | PARAPRENE | ELASTOLLAN | ELASTOLLAN | PARAPRENE | ELASTOLLAN | — | — |

TABLE 10-continued

| Item | Composition | | | | | | | |
|---|---|---|---|---|---|---|---|---|
| | Example 6-1 | Example 6-2 | Example 6-3 | Comparative Example 6-1 | Comparative Example 6-2 | Reference Example | Reference Example | Reference Example |
| | E185FNAT | P-22SM | E185FNAT | E185FNAT | P-22SM | E185FNAT | — | — |
| Amount (parts by weight) | 75 | 75 | 75 | 75 | 75 | 100 | — | — |
| Component A: | | | | | | | | |
| Specimen No. (types) | M-6a (modified) | M-6a (modified) | M-6b (ionically crosslinked) | SB-6 (unmodified) | SB-6 (unmodified) | — | SB-6 (unmodified) | M-6a (modified) |
| Amount (parts by weight) | 25 | 25 | 25 | 25 | 25 | — | 100 | 100 |
| Physical Properties: | | | | | | | | |
| Hardness (JIS) | 85 | 84 | 86 | 85 | 84 | 85 | 85 | 86 |
| 300% Modulus (kg/cm$^2$) | 75 | 58 | 82 | 76 | 57 | 105 | 23 | 26 |
| Tensile strength (kg/cm$^2$) | 348 | 370 | 363 | 244 | 270 | 403 | 142 | 168 |
| Elongation (%) | 670 | 630 | 620 | 720 | 640 | 600 | 1,000 | 970 |
| Tensile strength retaining factor after immersed in hot water (80° C.) for 30 days | 83 | 85 | 84 | 74 | 75 | 69 | — | — |

EXAMPLE 7-1 AND COMPARATIVE EXAMPLE 7-1

Compositions were prepared by kneading large amounts of the modified block copolymer or the unmodified block copolymer at the ratios shown in Table 11 using a mixing roll heated at 180° C. The properties of the compression molded products of these compositions were measured. Table 11 shows these results together with the results of a Reference Example.

As will be obvious from Table 11, the composition of Example 7-1 exhibits a tensile strength which is close to that of the block copolymer, and an improved resistance against oils and wear. The composition of Comparative Example 7-1, however, exhibits greatly deteriorated tensile strength and unchanged resistance against oils and wear.

TABLE 11

| | Composition | | |
|---|---|---|---|
| Item | Example 7-1 | Comparative Example 7-1 | Reference Example |
| Blending Ratio of Compositions: | | | |
| Component B: Type | ELASTOLLAN E180FNAT | ELASTOLLAN E180FNAT | — |
| Amount (parts by weight) | 15 | 15 | — |
| Component A: Specimen No. (type) | M-6a (modified) | SB-6 (unmodified) | SB-6 (unmodified) |
| Amount (parts by weight) | 85 | 85 | 100 |
| Physical Properties: | | | |
| Hardness (JIS) | 84 | 84 | 85 |
| Tensile strength (kg/cm$^2$) | 123 | 85 | 142 |
| Oil resistance (rate of weight increase) (%) | 36 | 54 | 73 |
| Picco abrasion (cc/80 times) | 0.018 | 0.031 | 0.057 |

EXAMPLE 8-1 AND COMPARATIVE EXAMPLE 8-1

The compositions shown in Table 12 were obtained by mixing a modified block copolymer (M-8b) containing large amounts of styrene and an unmodified block copolymer (SB-8) using a mixing roll heated at 170° C.

As will be obvious from the results of Table 12, the composition of Example 8-1 exhibits improved mechanical properties as compared with the block copolymer SB-8 of the Reference Example and the composition employing the unmodified block copolymer of Comparative Example 8-1.

TABLE 12

| | Composition No. | | |
|---|---|---|---|
| Item | Example 8-1 | Comparative Example 8-1 | Reference Example |
| Blending Ratio of Compositions: | | | |
| Component B: Type | ELASTOLLAN E195FNAT | ELASTOLLAN E195FNAT | — |
| Amount (parts by weight) | 20 | 20 | — |
| Component A: Specimen No. (type) | M-8b (modified) | SB-8 (unmodified) | SB-8 (unmodified) |

TABLE 12-continued

|  | Composition No. | | |
|---|---|---|---|
| Item | Example 8-1 | Comparative Example 8-1 | Reference Example |
| Amount (parts by weight) | 80 | 80 | 100 |
| Physical Properties: | | | |
| Izod impact strength (kg · cm/cm, with notch) | 2.8 | 2.1 | 1.8 |
| Tensile yield strength (kg/cm$^2$) | 330 | 312 | 295 |
| Elongation at break (%) | 24 | 15 | 20 |

EXAMPLES 9-1, 9-2, 9-3 AND COMPARATIVE EXAMPLES 9-1, 9-2, 9-3

The compositions shown in Table 13 were prepared by kneading a modified block copolymer M-2b and an unmodified block copolymer SB-2 using a Brabender plastograph at a temperature of 180° C. These compositions were adhered onto a polyvinyl chloride sheet and onto a high-density polyethylene sheet at 180° C., to measure the peeling strength. The results were as shown in Table 13.

As will be obvious from the results of Table 13, the compositions of the present invention exhibit excellent adhesiveness onto the polyvinyl chloride sheet and onto the polyethylene sheet over a wide composition range. The compositions of the Comparative Examples, on the other hand, exhibit inferior adhesiveness to that of the compositions of the present invention.

positions and the adhesiveness to the high-density polyethylene, were measured as shown in Table 14.

As will be obvious from the results of Table 14, the composition of Example 10-1, to which was added the modified block copolymer M-7a, exhibits astonishingly increased notched Izod impact strength as compared with the corresponding composition of Comparative Example 10-1, to which was added the unmodified block copolymer. The tensile yield strength of the composition of Example 10-1 was nearly equal to that of the composition of Comparative Example 10-1. The ethylene/vinyl alcohol copolymer of the Reference Example exhibited a small notched Izod impact strength.

Observation of the specimen of Example 10-1 and the specimen of Comparative Example 10-1 by a phase contrast microscope indicated that the modified block copolymer was uniformly dispersed in the form of parti-

TABLE 13

|  | Example No. | | | | | |
|---|---|---|---|---|---|---|
| Item | Example 9-1 | Example 9-2 | Example 9-3 | Comparative Example 9-1 | Comparative Example 9-2 | Comparative Example 9-3 |
| Blending Ratio: (parts by weight) | | | | | | |
| M-2b (modified) | 10 | 60 | 90 | — | — | — |
| SB-2 (unmodified) | — | — | — | 10 | 60 | 90 |
| Polyurethane (ELASTOLLANE E180FNAT) | 90 | 40 | 10 | 90 | 40 | 10 |
| 90° Peeling strength from polyvinyl chloride (kg/25 mm) | 10.7 | 10.1 | 6.5 | 8.7 | 3.3 | 1.1 |
| 180° Peeling strength from polyethylene (kg/25 mm) | 7.8 | 11.3 | 12.5 | 1.6 | 2.5 | 4.1 |

EXAMPLES 10-1 TO 10-5 AND COMPARATIVE EXAMPLES 10-1 TO 10-4

The compositions shown in Table 14 were obtained by kneading EVAL-EP-E (a product of Kuraray Co.) of an ethylene/vinyl alcohol copolymer, which is a saponified product of ethylene/vinyl acetate copolymer, as a vinyl alcohol-type polymer (component B), modified block copolymers M-7a, M-10a (component A), and unmodified block copolymers SB-7, SB-10 and SB-3 (component A) for comparison, using a mixing roll heated at 160° C. Further, an ionically crosslinked specimen M-7c was obtained by adding sodium methylate to the modified block copolymer M-7a in an amount of ¼ mole with respect to the acid anhydride groups contained in the copolymer M-7a, to thereby prepare a composition. The physical properties of the compression molded products (molded at 180° C. of these comcles of about 0.5 to 2 microns in size in the matrix of the ethylene/vinyl alcohol copolymer in the specimen of Example 10-1, while block copolymer particles of a size of about 5 to 10 microns or greater were dispersed in the specimen of Comparative Example 10-1. Namely, the two specimens exhibit conspicuously different compatibilities.

Even when other modified block copolymers were employed, or even when different compositions were treated, the compositions of the present invention exhibited greatly improved Izod impact strength as compared with the corresponding compositions containing the unmodified block copolymers of the Comparative Examples. Furthermore, the compositions of the present invention exhibited improved adhesiveness with respect to the polyethylene.

From the aforementioned results, therefore, it is obvious that the present invention provides very useful compositions.

TABLE 14

| Item | Example 10-1 | Example 10-2 | Example 10-3 | Example 10-4 | Example 10-5 | Comparative Example 10-1 | Comparative Example 10-2 | Comparative Example 10-3 | Comparative Example 10-4 | Reference Example |
|---|---|---|---|---|---|---|---|---|---|---|
| Blending Ratio of Compositions: | | | | | | | | | | |
| Component A: | | | | | | | | | | |
| Specimen No. | M-7a | M-7a | M-10a | M-3a | M-7c | SB-7 | SB-7 | SB-10 | SB-3 | — |
| Type | modified | modified | modified | modified | ionically cross-linked | unmodified | unmodified | unmodified | unmodified | |
| Amount (parts by weight) | 25 | 10 | 25 | 30 | 25 | 25 | 10 | 25 | 30 | — |
| Component B: (EVAL-EP-E) | | | | | | | | | | |
| Amount (parts by weight) | 75 | 90 | 75 | 70 | 75 | 75 | 90 | 75 | 70 | 100 |
| Physical Properties: | | | | | | | | | | |
| Melt index (200° C., load 5 kg) (gr/10 min) | 5.8 | 10.2 | 7.3 | 43 | 3.6 | 26.8 | 28.5 | 27.8 | 23.3 | 28.4 |
| Izod impact strength (kg · cm/cm, with notch) | 97.5 | 16.5 | 11.3 | 104.1 | 91.5 | 6.3 | 3.3 | 3.4 | 6.8 | 2.4 |
| Tensile yield strength (kg/cm$^2$) | 340 | 423 | 396 | 325 | 351 | 342 | 418 | 346 | 314 | 490 |
| Tensile breaking strength (kg/cm$^2$) | 285 | 336 | 320 | 261 | 290 | 315 | 390 | 312 | 309 | 450 |
| Elongation at break (%) | 60 | 80 | 25 | 50 | 55 | 10 | 26 | 23 | 7 | 200 |
| T-Peeling strength from* high-density polyethylene (kg/25 mm) | 3.3 | 1.8 | — | — | 3.4 | 0.3 | — | 1.2 | 1.0 | 0.1 or less |

*In accordance with JIS-K-6854

EXAMPLES 11-1, 11-2 AND COMPARATIVE EXAMPLES 11-1, 11-2

Compositions composed mainly of the modified block copolymer of the component A shown in Table 15 were prepared using a mixing roll heated at a temperature of 160° C. The physical properties, oil resistance and adhesiveness of the compression molded products (molded at 180° C.) of these compositions were measured to be as shown in Table 15.

It will be obvious from the results of Table 15 that the compositions of the present invention maintain sufficient machinability, while exhibiting high tensile stress and strikingly increased oil resistance with the addition of small amounts of the component B. Further, the compositions of the present invention exhibit better adhesiveness to the polyethylene than those of the Comparative Examples.

Thus, even when the component A is chiefly employed, the compositions of the present invention are useful as the improved block copolymers.

TABLE 15

| Item | Example 11-1 | Example 11-2 | Comparative Example 11-1 | Comparative Example 11-2 | Reference Example | Reference Example |
|---|---|---|---|---|---|---|
| Blending Ratio of Compositions: | | | | | | |
| Component A: Specimen No. | M-7a | M-7a | SB-7 | SB-7 | M-7a | SB-7 |
| Type | modified | modified | unmodified | unmodified | modified | modified |
| Amount (parts by weight) | 75 | 90 | 75 | 90 | 100 | 100 |
| Component B: Amount (parts by weight) (EVAL-EP-E) | 25 | 10 | 25 | 10 | — | — |
| Physical Properties: | | | | | | |
| Melt index (200° C., load 5 kg) (gr/10 min.) | 5.4 | 6.6 | 19.0 | 14.5 | 8.2 | 11.0 |
| Hardness (HS) (JIS) | 88 | 86 | 85 | 84 | 84 | 81 |
| 300% Modulus (kg/cm$^2$) | 66 | 38 | 41 | 27 | 24 | 21 |
| Tensile strength (kg/cm$^2$) | 121 | 142 | 95 | 118 | 163 | 143 |
| Elongation at break (%) | 900 | 950 | 1,000 | 1,000 | 1,010 | 1,050 |
| Oil resistance, rate of weight increase (%)* | 25 | 44 | 49 | 55 | 56 | 74 |

TABLE 15-continued

| | Example No. | | | | | |
|---|---|---|---|---|---|---|
| Item | Example 11-1 | Example 11-2 | Comparative Example 11-1 | Comparative Example 11-2 | Reference Example | Reference Example |
| T-Peeling strength from high-density** polyethylene (kg/25 mm) | 7.5 | 6.9 | 1.9 | 2.1 | 7.2 | 2.3 |

*Immersed in oil JIS No. 3 for 24 hours.
**In compliance with JIS-K-6854

EXAMPLES 12-1 TO 12-3 AND COMPARATIVE EXAMPLES 12-1, 12-2

Compositions were prepared by mixing the modified block copolymer M-7a, the modified block copolymer M-10a, and specimens SB-7 and SB-10 for comparison, together with methyl methacrylate resin (DELPET 80N, a product of Asahi Kasei Kogyo Co.) at the ratios shown in Table 16, using a mixing roll heated at 160° C. (Examples 12-1, 12-2 and Comparative Examples 12-1, 12-2). In Examples 12-3, a composition was prepared by using the ionically crosslinked polymer (M-7d) that was obtained by adding sodium methylate to the modified block copolymer M-7a in an amount of 0.5 mole with respect to the acid anhydride groups contained in the copolymer M-7a. The physical properties of the compression molded products of these compositions were measured, and cracking by the solvent was tested, as shown in Table 16.

The compositions of Examples 12-1 and 12-2 employing the modified block copolymers, and the compositions of Example 12-3, employing the ionically crosslinked product, exhibited improved impact resistance and good resistance against cracking by solvent as compared with the compositions of the Comparative Examples employing the unmodified block copolymers.

EXAMPLE 13-1 AND COMPARATIVE EXAMPLE 13-1

Compositins composed mainly of the modified block copolymer (M-7a) and the unmodified block copolymer (SB-7) for comparison, were mixed together at the ratios shown in Table 17 using a mixing roll heated at 160° C. The oil resistance and tensile strengths at ordinary temperature and at 70° C. of the compression molded products of these compositions were measured, and studied with regard to their resistance against oils and heat. The results were as shown in Table 17.

As will be obvious from the results of Table 17, the composition of Example 13-1 exhibited good resistance against oils and heat as compared with the composition of Comparative Example 13-1.

TABLE 17

| | Example No. | |
|---|---|---|
| Item | Example 13-1 | Comparative Example 13-1 |
| Component A: | | |
| Specimen No. (type) | M-7a (modified) | SB-7 (unmodified) |
| Amount (parts by weight) | 15 | 15 |
| Component B: | | |
| PMMA (parts by weight) | 85 | 85 |
| Physical Properties: | | |
| Oil Resistance* (rate of weight increase) (%) | 45 | 66 |
| Tensile strength | 112 | 95 |
| Tensile strength retaining factor at 70° C. (%) | 18 | 10 |

*Immersed in an oil of JIS No. 3 for 24 hours.

EXAMPLES 14-1, 14-2, 14-3 AND COMPARATIVE EXAMPLES 14-1, 14-2, 14-3

The compositions shown in Table 18 were kneaded using a mixing roll heated at 160° C., placed and adhered with pressure onto an aluminum plate at 180° C. to measure the peeling strength with respect to the aluminum plate. The results were as shown in Table 18.

As will be obvious from the results of Table 18, the compositions of Examples exhibit good adhesiveness as compared with the compositions of the corresponding Comparative Examples.

TABLE 16

| | Example No. | | | | | |
|---|---|---|---|---|---|---|
| Item | Example 12-1 | Example 12-2 | Example 12-3 | Comparative Example 12-1 | Comparative Example 12-2 | Reference Example |
| Component A: | | | | | | |
| Specimen No. (type) | M-7a (modified) | M-10a (modified) | M-7d (Ionically crosslinked) | SB-7 (unmodified) | SB-10 (unmodified) | — |
| Amount (parts by weight) | 25 | 25 | 25 | 25 | 25 | — |
| Component B: | | | | | | |
| PMMA (parts by weight) | 75 | 75 | 75 | 75 | 75 | 100 |
| Physical Properties: | | | | | | |
| Izod impact strength (kg.cm/cm, with notch) | 4.5 | 2.1 | 5.0 | 3.2 | 1.5 | 1.3 |
| Tensile yield strength (kg/cm²) | 259 | 280 | 272 | 224 | 251 | 720 |
| Elongation at break (%) | 12 | 5 | 10 | 6 | 4 | 3 |
| Corrosion by solvent* | ++ | ++ | ++ | + | + | — |

*Surfaces of the molded products were coated with acetone and were observed after drying.
++Good
+Slightly improved
—Poor

TABLE 18

| Item | Example 14-1 | Example 14-2 | Example 14-3 | Comparative Example 14-1 | Comparative Example 14-2 | Comparative Example 14-3 |
|---|---|---|---|---|---|---|
| Composition: (parts by weight) | | | | | | |
| M-7a (modified) | 8 | 40 | 70 | — | — | — |
| SB-7 (unmodified) | — | — | — | 8 | 40 | 70 |
| PMMA resin | 92 | 60 | 30 | 92 | 60 | 30 |
| Peeling strength*: (kg/25 mm) | 3.7 | 7.6 | 13.5 | 0.7 | 3.1 | 3.4 |

*In compliance with JIS-K-6854

EXAMPLES 15-1 TO 15-4 AND COMPARATIVE tions of the present invention employing modified block copolymers are very useful.

TABLE 19

| Item | Example 15-1 | Example 15-2 | Example 15-3 | Example 15-4 | Comparative Example 15-1 | Comparative Example 15-2 | Comparative Example 15-3 | Reference Example |
|---|---|---|---|---|---|---|---|---|
| Blending Ratio of Compositions: | | | | | | | | |
| Component A: | | | | | | | | |
| Specimen No. (type) | M-1b (modified) | M-1b (modified) | M-9a (modified) | M-1d (ionically crosslinked (Note 2) | SB-1 (unmodified) | SB-1 (unmodified) | SB-9 (unmodified) | — |
| Amount (parts by weight) | 20 | 15 | 30 | 10 | 20 | 15 | 30 | — |
| Component B: Polyvinyl chloride (Note 1) | | | | | | | | |
| Amount (parts by weight) | 80 | 60 | 70 | 90 | 80 | 60 | 70 | 100 |
| Additive: | | | | | | | | |
| Type | — | dioctyl phthalate | — | — | — | dioctyl phthalate | — | — |
| Amount (parts by weight) | — | 25 | — | — | — | 25 | — | — |
| Physical Properties: | | | | | | | | |
| Izod impact strength (kg.cm/cm, with notch) | 8.4 | 10.5 | 5.7 | 10.3 | 6.5 | 9.6 | 4.9 | 4.6 |
| Transparency, Haze (%) | 14.6 | 8.9 | 15.3 | 17.1 | 43.0 | 38.2 | 41.3 | 2.5 |

Note 1:
Polyvinyl chloride . . . Nippolit SL (a product of Chisso Co., average polymerization degree 1030).
Note 2:
M-1d (Ionically crosslinked product) . . . Specimen P was ionically crosslinked by the addition of NaOH in an amount of ⅓ mole with respect to acid anhydride groups.

EXAMPLES 15-1 TO 15-3

Compositions were obtained by blending the modified block copolymers M-1b and M-9a and polyvinyl chloride as shown in Table 19, using a mixing roll heated at 175° C. These compositions were admixed with a stabilizer for vinyl chloride in an amount of 2 parts by weight with respect to the total amount. For the purpose of comparison, compositions were prepared in the same manner by using the unmodified block copolymers SB-1 and SB-9 (Comparative Examples 15-1 to 15-3). Izod impact strength and transparency (sheet of a thickness of 0.3 mm) of the compression molded products of these compositions were measured. The results were as shown in Table 19. Table 19 also shows the measured results of the polyvinyl chloride as the Reference Example.

All of the compositions of Examples 15-1 to 15-4 exhibited improved compatibility with respect to polyvinyl chloride, as well as good transparency and improved impact resistance as compared with the compositions of the corresponding Comparative Examples 15-1 to 15-3. It is, therefore, obvious that the composi-

EXAMPLES 16-1, 16-2 AND COMPARATIVE EXAMPLES 16-1, 16-2

The compositions of Table 20 were prepared employing the modified block copolymer M-1b in large amounts, using a mixing roll heated at 175° C. (Examples 16-1 and 16-2). Compositions were also prepared in the same manner but using the unmodified block copolymer SB-1 instead of the modified block copolymer M-1b (Comparative Examples 16-1 and 16-2). The physical properties of these compositions and of the unmodified block copolymer SB-1 of the Reference Example are shown in Table 20.

As will be obvious from the transparency (measured using a sheet of a thickness of 0.3 mm) and oil resistance shown in Table 20, the compositions employing the modified block copolymer of Examples 16-1 and 16-2, exhibited improved compatibility with respect to two phases, good transparency and increased oil resistance, as compared with the compositions of the corresponding Comparative Examples 16-1 and 16-2 employing the unmodified block copolymer.

TABLE 20

| Item | | Example 16-1 | Example 16-2 | Comparative Example 16-1 | Comparative Example 16-2 | Reference Example |
|---|---|---|---|---|---|---|
| Blending Ratio of Compositions: | | | | | | |
| Component A: | Specimen No. (type) | M-1b (modified) | M-1b (modified) | SB-1 (unmodified) | SB-1 (unmodified) | SB-1 (unmodified) |
| | Amount (parts by weight) | 75 | 80 | 75 | 80 | 100 |
| Component B: | Type | Polyvinyl chloride | Vinyl chloride-vinyl acetate copolymer (Note 1) | Polyvinyl chloride | Vinyl chloride-vinyl acetate copolymer (Note 1) | — |
| | Amount (parts by weight) | 15 | 20 | 15 | 20 | — |
| Additive: | Type | Dibutyl phthalate | — | Dibutyl phthalate | — | — |
| | Amount (parts by weight) | 10 | — | 10 | — | — |
| Physical Properties: | | | | | | |
| Transparency, Haze (%) | | 7.2 | 9.8 | 25.4 | 21.2 | 2.6 |
| Oil resistance (Note 2) (rate of weight increase) (%) | | 41 | 44 | 66 | 61 | 74 |

(Note 1)
Vinyl chloride-vinyl acetate copolymer: Nippolit MR (a product of Chisso Co., average polymerization degree 800).
(Note 2)
Immersed in an oil of JIS No. 3 at 25° C. for 24 hours.

EXAMPLE 17-1 AND COMPARATIVE EXAMPLE 17-1

Composition of the modified block copolymer M-1b (Example 17-1) or the unmodified block copolymer SB-1 (Comparative Example 17-1) and the chlorinated polyethylene ELASLEN manufactured from Showa Denko Co.) listed in Table 21 below was prepared by blending in a Brabender Plastograph at 200° C.

The results of the oil resistance test of these compositions are shown in Table 21 below. As will be obvious from the results in Table 21, the oil resistance of the composition of Example 17-1 containing the modified block copolymer is improved, as compared with that of the composition of Comparative Example 17-1.

TABLE 21

| Item | Example 17-1 | Comparative Example 17-1 |
|---|---|---|
| Component A: | | |
| Modified block copolymer (M-1b) (parts by weight) | 77 | — |
| Unmodified block copolymer (SB-1) (parts by weight) | — | 75 |
| Component B: | | |
| Chlorinated polyethylene (parts by weight) | 25 | 25 |
| Oil Resistance* | 33 | 56 |

TABLE 21-continued

| Item | Example 17-1 | Comparative Example 17-1 |
|---|---|---|
| (rate of weight increase) (%) | | |

*Immersed in an oil of JIS No. 3 for 24 hours

EXAMPLES 18-1 TO 18-3 AND COMPARATIVE EXAMPLES 18-1 TO 18-3

The compositions containing the modified block copolymer M-7a or M-3a (Examples) on the unmodified block copolymer SB-7 or SB-3 as component A and Surlyn A (i.e. ionomer) as component B, listed in Table 22 below, were prepared by mixing in a mixing roll at 180° C. The phisical properties of the compression-molded articles obtained from these compositions are shown in Table 22.

As will be clear from the results shown in Table 22, the tensile stressing of the present compositions containing the modified block copolymers is improved and the oil resistance of the block copolymer is remarkably improved by the addition of the ionomer.

Furthermore, it was confirmed by analysis with an IR spectrophotometer that the acid anhydride groups in the modified block copolymers were ionically cross-linked.

TABLE 22

| | Example 18 | | | Comparative Example 18 | | | Reference Example | |
|---|---|---|---|---|---|---|---|---|
| | 1 | 2 | 3 | 1 | 2 | 3 | | |
| Kind of Component A | M-7a | M-7a | M-3a | SB-7 | SB-7 | SB-3 | M-3a | SB-3 |
| Amounts (parts by weight) | 80 | 70 | 90 | 80 | 70 | 90 | 100 | 100 |
| Amount of Component B (Ionomer) (parts by weight) | 20 | 30 | 10 | 20 | 30 | 10 | — | — |
| Hardness (HS) (JIS) | 90 | 92 | 86 | 88 | 90 | 85 | 84 | 21 |
| 300% Modulus (Kg/cm$^2$) | 67 | 73 | 50 | 37 | 43 | 30 | 24 | 21 |
| Tensile Strength (Kg/cm$^2$) | 143 | 150 | 170 | 83 | 76 | 100 | 163 | 143 |
| Elongation at break (%) | 720 | 630 | 700 | 850 | 760 | 740 | 1010 | 1050 |
| Oil Resistance (%)* (Rate of Weight Increase) | 21 | 15 | 33 | 64 | 59 | 68 | 56 | 74 |

*Immersed in an oil of JIS No. 3 at a room temperature for 24 hours.

EXAMPLES 19-1 TO 19-5 AND COMPARATIVE EXAMPLES 19-1 TO 19-4

The compositions, listed in Table 23 below, containing the modified block copolymer M-7a, M-10a or the ionically crosslinked product M-7e of M-7a (Example) or the unmodified block copolymer SB-7 or SB-10 (Comparative Example) as component A, COPOLENE QD-400 (ionomer available from Asahi Dow Co.) as component C were prepared by blending the components in a mixing roll at 180° C. The physical properties of the composition thus obtained were examined and the results are shown in Table 23 below.

As will be clear from the results in Table 23, the adhesion properties and the water resistance of the adhesion strength of the present compositions of Examples 19-1 to 19-4 to nylon (non-stretch sheet of nylon-6) are superior to those of the compositions of Comparative Examples 19-1 to 19-4. In addition, the tensile strength of the present compositions of Examples 19-1 to 19-4 are higher than those of the corresponding comparative compositions of comparative Examples 19-1 to 19-4. Furthermore, in Example 19-5, the ionically crosslinked product M-7e of the modified block copolymer M-7a was used as component A in the composition. The ionically crosslinked product M-7e was prepared by ionically crosslinking the modified block copolymer M-7a with sodium methylate ($CH_3ONa$/acid anhydride group=0.4). The tensile strength of the composition of Example 19-5 containing the ionically crosslinked product M-7e is improved over the composition containing the modified block copolymer M-7a and the water resistance of the adhesion strength thereof is also good.

small portions over 20 minutes and were mixed for further 10 minutes.

The resultant composition (Example 20-1) was clear and it was observed by IR spectrophotometer analysis that the absorption band of the dicarboxylic anhydride group of the modified block copolymer disappeared at approximately 1785 $cm^{-1}$ and a new absorption band appeared at approximately 1730 $cm^{-1}$. The appearance of the absorption band at approximately 1730 $cm^{-1}$ corresponding to the ester group shows that the acid anhydride groups of the component A were reacted with the terminal hydroxyl groups to form graft copolymers in the composition. It was also observed by a solvent extraction that approximately 10% of the component B remained in the composition without causing the reaction.

As a comparative example, although 100 parts by weight of the unmodified block copolymer SB-7 was blended with 15 parts by weight of the component B employed in Example 20-1 in manner as described in Example 20-1, only a small amount of the component B could be fed to the Brabender Plastograph, since the compatibility or miscibility of the components A and B was not good. The resultant composition was not clear.

The physical properties of the compositions of Example 20-1 and Comparative Example 20-1, as well as the unmodified blook copolymer SB-7, are shown in Table 24 below. As will be clear from the results in Table 24, the oil resistance of the composition of Example 20-1 was improved, compared to the unmodified block copolymer SB-7, while other properties, including the mechanical properties, such as the tensile strength and the hardness, and the rubberiness and the flowability of

TABLE 23

| Item | | Example 19 | | | | Comparative Example 19 | | | | Reference Example | Example 19-5 |
|---|---|---|---|---|---|---|---|---|---|---|---|
| | | 1 | 2 | 3 | 4 | 1 | 2 | 3 | 4 | | |
| COMPOSITION | | | | | | | | | | | |
| Type of Component A | | M-7a | M-10a | M-7a | M-7a | SB-7 | SB-10 | SB-7 | SB-7 | — | M-7e |
| Amount of Component A (parts by weight) | | 20 | 30 | 40 | 30 | 20 | 30 | 40 | 30 | — | 20 |
| Amount of Ionomer (component B) (parts by weight) | | 80 | 70 | 60 | 50 | 80 | 70 | 60 | 50 | 100 | 80 |
| Amount of Low-density Polyethylene (Component C) (parts by weight) | | — | — | — | 20 | — | — | — | 20 | | — |
| PHYSICAL PROPERTY | | | | | | | | | | | |
| Tensile Strength ($Kg/cm^2$) | | 256 | 230 | 206 | 215 | 232 | 233 | 191 | 198 | 323 | 271 |
| Elongation at break (%) | | 380 | 310 | 370 | 330 | 390 | 290 | 360 | 330 | 440 | 370 |
| Adhesion Peel Strength to Nylon (Kg/25 mm)[1] | Before immersion | 3.5 | 3.3 | 5.3 | 3.1 | 1.1 | 0.9 | 1.0 | 0.5 | 1.2 | 3.4 |
| | After immersion[2] | 2.8 | 3.1 | 4.4 | 2.7 | 0.2 | 0.1 | 0.1 | 0.1 | 0.2 | 3.0 |

[1]According to a method of JIS-K-6854
[2]The determination was made after the test pieces were immersed in water at 60° C. for 24 hours.

EXAMPLE 20-1 AND COMPARATIVE EXAMPLE 20-1

A polymer composition containing 100 parts by weight of the modified block copolymer M-7b as component A and 15 parts by weight of polyethylene glycol nonylphenyl ether, as component B, which was an oligomer containing hydroxyl group and which was available from Nippon Oil and Fat Co., as NONION NS-220 (polymerization degree of polyethylene glycol=20 and number-average molecular weight=1100) was prepared as follows: 100 parts by weight of the component A were fed to a Brabender Plastograph at a temperature of 170° C. After the component A was melted in the Brabender Plastograph, 15 parts of the component B were fed to the Brabender Plastograph in the present composition were substantially maintained at the levels of those of the unmodified block copolymer SB-7. In addition, although the blending ratio of the component B was small (i.e. the ratio of component B/component A=7/100), the properites, such as the tensile strength, of the composition of the Comparative Example 20-1 were remarkably decreased, compared with the present composition and the unmodified block copolymer.

TABLE 24

| | Example 20-1 | Comparative Example 20-1 | Reference Example |
|---|---|---|---|
| Type of Composition | M7b + | SB-7 + | SB-7 |

TABLE 24-continued

|  | Example 20-1 | Comparative Example 20-1 | Reference Example 5 |
|---|---|---|---|
| or Polymer | OH Oligomer | OH Oligomer |  |
| Hardness (JIS) | 79 | 77 | 80 |
| 300% Modulus (Kg/cm$^2$) | 20 | 14 | 21 |
| Tensile Strength (Kg/cm$^2$) | 138 | 80 | 143 |
| Elongation at break (%) | 1100 | 800 | 1050 |
| Resilience (Dunlop) (%) | 47 | — | 45 |
| Melt Index (g/10 min) | 8.0 | 22.3 | 11.0 |
| Oil Resistance*[1] (Weight Increase %) | 46 | — | 74 |

*[1]Immersed in an oil of JIS No. 3 at 25° C. for 24 hours.

EXAMPLES 21-1 TO 21-4 AND COMPARATIVE EXAMPLES 21-1 TO 21-4

Various compositions containing the modified block copolymer M-7b (Example) or the unmodified block copolymer SB-7 (Comparative Example) as component A and the various polar oligomers listed in Table 25 below as component B were prepared in a blending ratio listed in Table 25 in a manner as described in the preceding Example. The physical properties of these compositions are shown in Table 25 below.

As will be clear from the results shown in Table 25, the properties of the present compositions of Examples 21-1 to 21-4 are improved over those of the corresponding comparative compositions of Comparative Examples 21-1 to 21-4 and the use of the polar oligomers are effective in the improvement of the polar oligomers.

TABLE 25

|  | Example 21-1 | Comparative Example 21-1 | Example 21-2 | Comparative Example 21-2 | Example 21-3 | Comparative Example 21-3 | Example 21-4 | Comparative Example 21-4 |
|---|---|---|---|---|---|---|---|---|
| COMPOSITION |  |  |  |  |  |  |  |  |
| Amount of Modified Block Copolymer M-7b (parts by weight) | 100 | — | 100 | — | 100 | — | 100 | — |
| Amount of Unmodified Block Copolymer SB-7 (parts by weight) | — | 100 | — | 100 | — | 100 | — | 100 |
| Type of Polar Oligomer (Component B) | Amino-terminated Liquid NBR (Ube Industries Ltd., HYCAR ATBN MW = 3500) | | Epoxyidized Polybutadiene (Adeka Argus Co., BF-1000, MW = 1000) | | Styrene-MMA-GMA Copolymer (GMA: 3% by weight, MW = 5000) | | Isocyanated Polybutadiene (NISSO-PB-TP-1000, NCO = 3.8%) | |
| Addition Amount (parts by weight) | 15 | | 40 | | 20 | | 10 | |
| PHYSICAL PROPERTY |  |  |  |  |  |  |  |  |
| Tensile Strength (parts by weight) | 141 | 80 | 130 | 100 | 175 | 120 | 155 | 108 |
| Oil Resistance (Increased weight %) | 51 | 68 | 55 | 71 | 43 | 66 | 53 | 76 |

What we claim is:

1. A thermoplastic polymer composition comprising:
(a) 1 to 99 parts by weight of a component A consisting essentially of at least one member selected from the group consisting of modified block copolymers and the ionically crosslinked products of at least one said modified block copolymer with at least one univalent, bivalent, or trivalent metal ion, said modified block copolymer comprising a block copolymer of at least one aromatic vinyl compound and at least one conjugated diene compound onto which at least one molecular unit containing at least one dicarboxylic acid group or the derivative thereof is grafted; and (b) 99 to 1 parts by weight of a component B consisting essentially of at least one thermoplastic polymer containing at least one polar group and selected from the group consisting of polyamides, polyurethanes, vinylalcohol polymers, polyacrylates, polymethacrylates, chlorinated hydrocarbon polymers, and ionomers.

2. A composition as claimed in claim 1, wherein the content of the molecular unit containing the dicarboxylic acid group or the derivative thereof in the modified block copolymer of the component A is 0.05 through 20 parts by weight, based on 100 parts by weight of the modified block copolymer.

3. A composition as claimed in claim 3, wherein the derivative of the dicarboxylic acid group of the component A is a dicarboxylic anhydride group.

4. A composition as claimed in claim 1, wherein the content of the aromatic vinyl compound in the block copolymer of the aromatic vinyl compound and the conjugated diene compound of the component A is 5 through 70% by weight, based on the weight of the block copolymer.

5. A composition as claimed in claim 1, wherein the content of the aromatic vinyl compound in the block copolymer of the aromatic vinyl compound and the conjugated diene compound of the component A is more than 70% by weight through 95% by weight, based on the weight of the block copolymer.

6. A composition as claimed in claim 1, wherein the ionically crosslinked modified block copolymer is derived from the reaction of the modified block copolymer with at least one metallic compound selected from the group consisting of the compounds of univalent, bivalent and trivalent metal ions.

7. A composition as claimed in claim 6, wherein the molar ratio of the metal component of the metallic compound to the dicarboxylic acid or the derivative thereof contained in the modified block copolymer of the component A is 0.1 through 3.0.

8. A composition as claimed in claim 1, wherein the modified block copolymer of the component A is derived from the reaction of the block copolymer of the aromatic vinyl compound and the conjugated diene compound with an unsaturated dicarboxylic acid or the derivative thereof.

9. A composition as claimed in claim 8, wherein the modified block copolymer of the component A is derived from the reaction of the block copolymer with an unsaturated dicarboxylic acid or the derivative thereof in a molten state in the absence of a free-radical initiator.

10. A composition as claimed in claim 9, wherein the unsaturated dicarboxylic acid or the derivative thereof is at least one member selected from the group consisting of maleic acid, fumaric acid and maleic anhydride.

11. A composition as claimed in claim 1, wherein the polyamide of the component B is at least one member selected from the group consisting of ring opening polymers of cyclic lactums, poly condensates of α-amino carbonic acids, polycondensates of dicarboxylic acids and diamines and copolymers of these monomers.

12. A composition as claimed in claim 11, wherein the polyamide of the component B is selected from the group consisting of poly (ε-caprolactam), poly(hexamethyleneadipamide) (nylon-6,6) and copolymers of nylon-6 and nylon-6,6.

13. A composition as claimed in claim 1, wherein the polyurethane of the component B is at least one thermoplastic elastomer.

14. A composition as claimed in claim 13, wherein the polyurethane is a complete thermoplastic type polyurethane derived from a diisocyanate compound and a dihydroxy compound, the molar ratio (NCO/OH) of the diisocyanate compound and the dihydroxy compound being more than 0.95 through 1.

15. A composition as claimed in claim 13, wherein the polyurethane is an incomplete thermoplastic type polyurethane derived from a diisocyanate compound and a dihydroxy compound, the molar ratio (NCO/OH) of the diisocyanate compound and the dihydroxy compound being more than 1 and less than 1.1.

16. A composition as claimed in claim 1, wherein the polyvinyl alcohols of the component B are saponified ethylene-vinyl acetate copolymers.

17. A composition as claimed in claim 16, wherein the vinyl acetate content of the ethylene-vinyl acetate copolymers is 0.5 through 80 mol%.

18. A composition as claimed in claim 17, wherein the saponification degree of the vinyl acetate is 10 through 100 mol%.

19. A composition as claimed in claim 1, wherein the polyacrylates or polymethacrylates of the component B are those which contain more than 50% by weight of alkyl esters of acrylic or methacrylic acid having an alkyl group of 1 through 12 carbon atoms.

20. A composition as claimed in claim 19, wherein the polymethacrylate is selected from the group consisting of poly(methyl methacrylate) and copolymers of methyl methacrylate and other comonomers copolymerizable therewith.

21. A composition as claimed in claim 1, wherein the chlorinated hydrocarbon polymer of the component B is at least one selected from the group consisting of polyvinyl chloride and copolymers of vinyl chloride and other comonomers copolymerizable therewith.

22. A composition as claimed in claim 1, wherein the chlorinated hydrocarbon polymers are chlorinated polyolefins.

23. A composition as claimed in claim 1, wherein the ionomers of the component B are ionically crosslinked products of base copolymers of α,β-unsaturated carboxylic acids and othwer monomers copolymerizable therewith in which base copolymers are ionically crosslinked with at least one metallic ion selected from the group consisting of univalent, bivalent and trivalent metallic ions.

24. A composition as claimed in claim 23, wherein the base copolymers of the ionomer are olefin-α,β-unsaturated monocarboxylic acid copolymers.

25. A composition as claimed in claim 24, wherein the olefin-α,β-unsaturated monocarboxylic acid copolymer is ethylene-acrylic acid copolymer or ethylene-methacrylic acid copolymer.

26. A composition as claimed in claim 23, wherein the content of the α,β-unsaturated carboxylic acid in the base copolymer is 0.2 through 25 mol%.

27. A composition as claimed in claim 1, wherein the composition comprises 1% by weight through less than 50% by weight of the component A and more than 50% by weight through 99% by weight of the component B.

28. A composition as claimed in claim 1, wherein the composition comprises 50 through 99% by weight of the component A and 1 through 50% by weight of the component B.

29. A composition as claimed in claim 1, wherein the composition further contains a component C consisting essentially of at least one member selected from the group consisting of styrene polymers and polyolefins, the content of the component C being 1 through 100 parts by weight based on 100 parts of the total amounts of the components A and B.

30. A composition as claimed in claim 1, wherein the composition is an adhesive composition.

31. A thermoplastic polymer composition comprising:
(a) 1 through 99 parts by weight of a component A consisting essentially of a modified block copolymer, said modified block copolymer comprising a block of at least one aromatic vinyl compound and at least one conjugated diene compound onto which is grafted at least one molecular unit containing at least one dicarboxylic acid group or the derivative thereof; and
(b) 99 through 1 parts by weight of a component B consisting essentially of at least one vinyl alcohol polymer.

32. A composition as claimed in claim 31, wherein the content of the molecular unit containing the dicarboxylic acid group or the derivative thereof in the modified block copolymer of the component A is 0.05 through 20 parts by weight, based on 100 parts by weight of the modified block copolymer.

33. A composition as claimed in claim 31, wherein the derivative of the dicarboxylic acid group of the component A is a dicarboxylic anhydride group.

34. A composition as claimed in claim 31, wherein the content of the aromatic vinyl compound in the block copolymer of the aromatic vinyl compound and the conjugated diene compound of the component A is 5 through 70% by weight, based on the weight of the block copolymer.

35. A composition as claimed in claim 31, wherein the content of the aromatic vinyl compound in the block copolymer of the aromatic vinyl compound and the conjugated diene compound of the component A is more that 70% by weight through 95% by weight, based on the weight of the block copolymer.

36. A composition as claimed in claim 31, wherein the modified block copolymer of the component A is derived from the reaction of the block copolymer of the aromatic vinyl compound and the conjugated diene compound with an unsaturated dicarboxylic acid or the derivative thereof.

37. A composition as claimed in claim 36, wherein the modified block copolymer of the component A is derived from the reaction of the block copolymer with an unsaturated dicarboxylic acid or the derivative thereof in a molten state in the absence of a free-radical initiator.

38. A composition as claimed in claim 37, wherein the unsaturated dicarboxylic acid or the derivative thereof is at least one member selected from the group consisting of maleic acid, fumaric acid and maleic anhydride.

39. A composition as claimed in claim 31, wherein the polyvinyl alcohols of the component B are saponified ethylene-vinyl acetate copolymers.

40. A composition as claimed in claim 39, wherein the vinyl acetate content of the ethylene-vinyl acetate copolymers is 0.5 through 80 mol%.

41. A composition as claimed in claim 39, wherein the saponification degree of the vinyl acetate is 10 through 100 mol%.

42. A composition as claimed in claim 31, wherein the composition comprises 1% by weight through less than 50% by weight of the component A and more than 50% by weight through 99% by weight of the component B.

43. A composition as claimed in claim 31, wherein the composition comprises 50 through 99% by weight of the component A and 1 through 50% by weight of the component B.

44. A composition as claimed in claim 31, wherein the composition further contains a component C consisting essentially of at least one member selected from the group consisting of styrene polymers and polyolefins, the content of the component C being 1 through 100 parts by weight based on 100 parts of the total amounts of the components A and B.

45. A composition as claimed in claim 31, wherein the composition is an adhesive composition.

46. A thermoplastic polymer composition comprising:
(a) 1 through 99 parts by weight of a component A consisting essentially of a modified block copolymer, said modified block copolymer comprising a block copolymer of at least one aromatic vinyl compound and at least one conjugated diene compound onto which at least one molecular unit containing at least one dicarboxylic acid group or the derivative thereof is grafted; and
(b) 99 through 1 parts by weight of a component B consisting essentially of at least one polyamide.

47. A composition as claimed in claim 46, wherein the polyamide of the component B is at least one member selected from the group consisting of ring opening polymers of cyclic lactams, polycondensates of α-amino carbonic acids, polycondensates of dicarboxylic acids and diamines and copolymers of these monomers.

48. A composition as claimed in claim 46, wherein the polyamide of the component B is selected from the group consisting of poly (ε-caprolactam) (nylon-6), poly (hexamethyleneadipamide) and copolymers of ε-caprolactam and hexamethylene-adipamide.

49. A composition as claimed in claim 46, wherein the composition is an adhesive composition.

* * * * *